(12) United States Patent
Dubeyko et al.

(10) Patent No.: US 12,333,151 B2
(45) Date of Patent: Jun. 17, 2025

(54) GUARANTEEING ONLINE SERVICES BASED ON PREDICTING FAILURES OF STORAGE DEVICES

(71) Applicants: Lemon Inc., Grand Cayman (KY); BEIJING YOUZHUJU NETWORK TECHNOLOGY CO., LTD., Beijing (CN)

(72) Inventors: Viacheslav Dubeyko, Los Angeles, CA (US); Neema Mashayekhi, Los Angeles, CA (US); Cong Wang, Los Angeles, CA (US); Jian Wang, Beijing (CN)

(73) Assignees: Lemon Inc., Grand Cayman (KY); Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/223,477

(22) Filed: Jul. 18, 2023

(65) Prior Publication Data
US 2023/0359364 A1 Nov. 9, 2023

(51) Int. Cl.
*G06F 3/06* (2006.01)
(52) U.S. Cl.
CPC .......... *G06F 3/0614* (2013.01); *G06F 3/0649* (2013.01); *G06F 3/0679* (2013.01)

(58) Field of Classification Search
CPC ..... G06F 3/0679; G06F 3/0649; G06F 3/0614
See application file for complete search history.

(56) References Cited

U.S. PATENT DOCUMENTS

| | | | |
|---|---|---|---|
| 2014/0201576 A1* | 7/2014 | Wu | G06F 11/2094 714/47.2 |
| 2017/0131947 A1* | 5/2017 | Hoang | G06F 11/3034 |
| 2018/0284997 A1* | 10/2018 | Dalmatov | G11C 16/349 |
| 2022/0179724 A1* | 6/2022 | Shim | G06N 20/00 |
| 2023/0305721 A1* | 9/2023 | Kim | G06F 3/0619 |
| 2023/0325092 A1* | 10/2023 | Alshawabkeh | G06F 3/0607 711/154 |

* cited by examiner

*Primary Examiner* — Edward J Dudek, Jr.
(74) *Attorney, Agent, or Firm* — BakerHostetler

(57) ABSTRACT

The present disclosure describes techniques for guaranteeing online services based on predicting failures of storage devices. Statistical data may be extracted on a regular basis by each of a plurality of storage devices. Each of the plurality of storage devices may comprise a set of NAND dies. Each of the set of NAND dies may be configured to measure and track a set of metrics indicating characteristics of each NAND die. Prediction data indicating potential failures of the plurality of storage devices may be generated. The prediction data may be shared with a host on a periodic basis. A strategy of decommissioning an aged storage device and adding a new storage device based on the prediction data may be created by the host. The data migration to the new storage device may be implemented.

17 Claims, 24 Drawing Sheets

1000

| Read Latency | Program Latency | Erase Latency | Bad Block Number |
|---|---|---|---|
| $Value_1^R$ | $Value_1^P$ | $Value_1^E$ | ∅ |
| $Value_2^R$ | $Value_2^P$ | $Value_2^E$ | ∅ |
| $Value_3^R$ | $Value_3^P$ | $Value_3^E$ | 1 |
| $Value_4^R$ | $Value_4^P$ | $Value_4^E$ | 3 |
| $Value_5^R$ | $Value_5^P$ | $Value_5^E$ | 4 |
| $Value_6^R$ | $Value_6^P$ | $Value_6^E$ | 10 |

Measurements: 1, 2, 3, 4, 5, 6

$\{Value_3^R ; Value_3^P ; Value_3^E\}$ ⟶ Threshold of first bad erase block $\begin{Bmatrix} Value_4^R - Value_3^R \\ Value_4^P - Value_3^P \\ Value_4^E - Value_3^E \end{Bmatrix}$ ⟶ $\{3-1\}$ ⟶ Estimation of latency increasing to have two bad blocks

FIG. 10

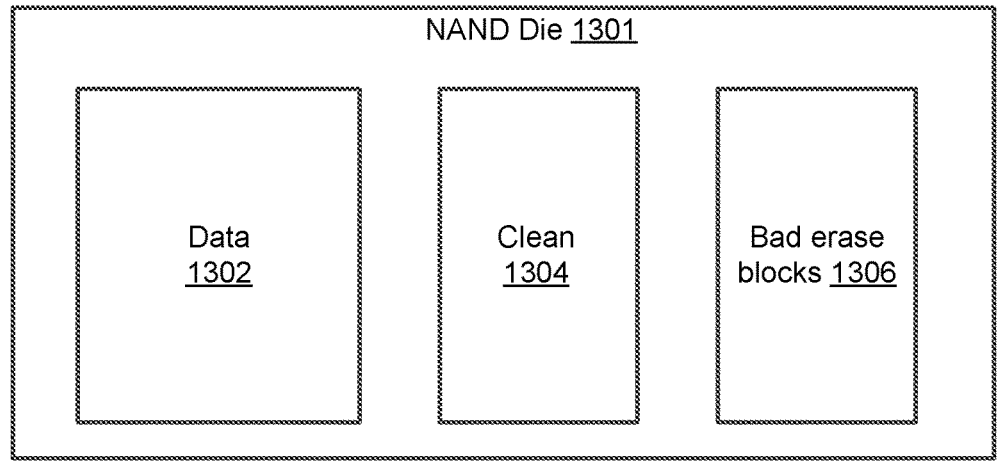
$$B_{data} + B_{clean} + B_{bad} = B_{total}$$
$$B_{clean} * Prediction_{\{min,\ average,\ max\}} = T_{estimated\ failure}$$
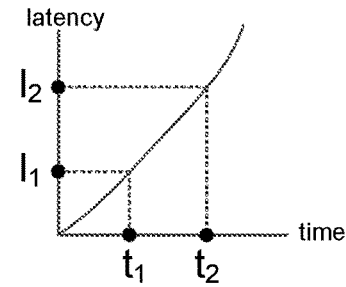
$$Latency\_Growth\_Rate = \frac{l_2 - l_1}{t_2 - t_1}$$
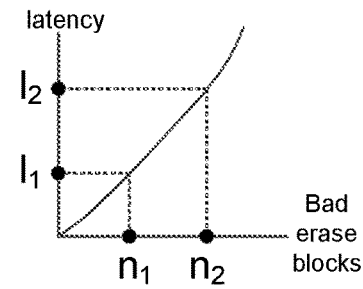
$$Latency\_Growth\_Per\_Block = \frac{l_2 - l_1}{n_2 - n_1}$$
$$B_{clean} * \underbrace{\frac{Latency\_Growth\_Per\_Block}{Latency\_Growth\_Rate}}_{Prediction} = T_{estimated\ failure}$$
FIG. 13

GUARANTEEING ONLINE SERVICES BASED ON PREDICTING FAILURES OF STORAGE DEVICES

BACKGROUND

Storage devices may be used to store and/or access digital data. Storage devices may be associated with various issues, such as write errors, read errors, data corruption, and/or storage device failure. If a storage device fails, online services associated with the storage device may be shut down and/or unavailable. Therefore, techniques for guaranteeing online services are needed.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 10 shows another example system for keeping and analyzing statistics in accordance with the present disclosure.

FIG. 13 shows another example system for storage device failure prediction using latency statistics analysis in accordance with the present disclosure.

DETAILED DESCRIPTION OF ILLUSTRATIVE EMBODIMENTS

Figure 1:
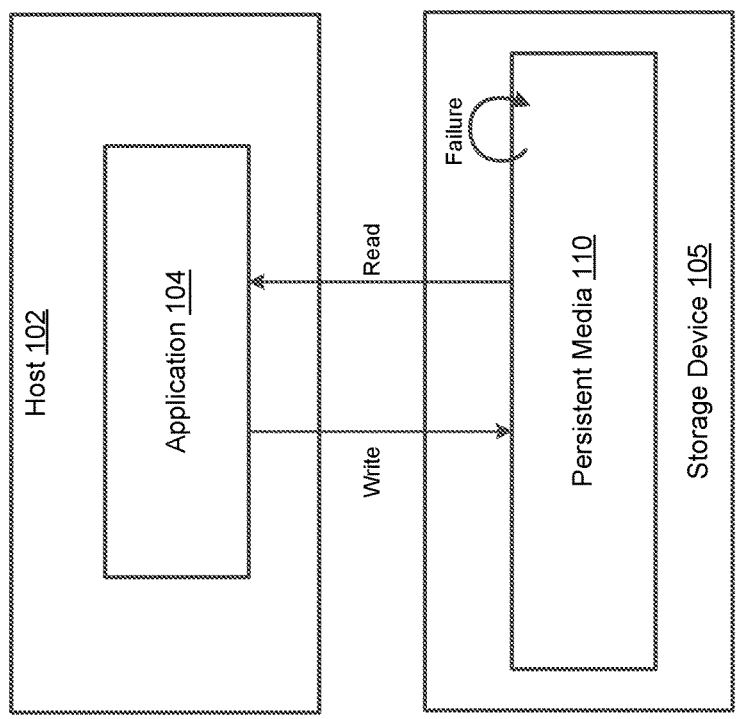
FIG. 1 shows an example framework for storage device failure in accordance with the present disclosure.

Storage devices may be used to store and/or access digital data. However, storage devices may have a limited lifetime. Further, storage devices may be associated with various issues, such as write errors, read errors, data corruption, and/or storage device failure. FIG. 1 shows an example framework 100 in accordance with the present disclosure. The example framework 100 comprises a host 102 and one or more storage device(s) 105. The host 102 may comprise at least one central processing unit (CPU) and at least one dynamic random access memory (DRAM). The host 102 may comprise an application 104. The application 104 may be stored in the DRAM memory during execution and the CPU(s) may be configured to execute the instruction sequence associated with the application 104. The storage device 105 may comprise a persistent media 110. The application 104 may issue write or read request(s) to the storage device 105. For example, the application 104 may issue one or more requests to write data into the persistent media 110 of the storage device 105. The application 104 may also issue one or more requests to read or pre-fetch data already stored in the persistent media 110 of the storage device 105.

The persistent media 110 may degrade over time. A degraded persistent media 110 may cause read errors, write errors, and/or data corruption issues. Such issues may inevitably increase the total cost of ownership (TCO) associated with the storage device 105. While read errors, write errors, and/or data corruption issues may be difficult to predict, software may be able to manage such issues. Failure of the storage device 105 may cause the shutdown or unavailability of services for a significant amount of time. As a result, predicting storage device failures before they happen may decrease TCO and may guarantee online services online without any interruption.

Figure 2:
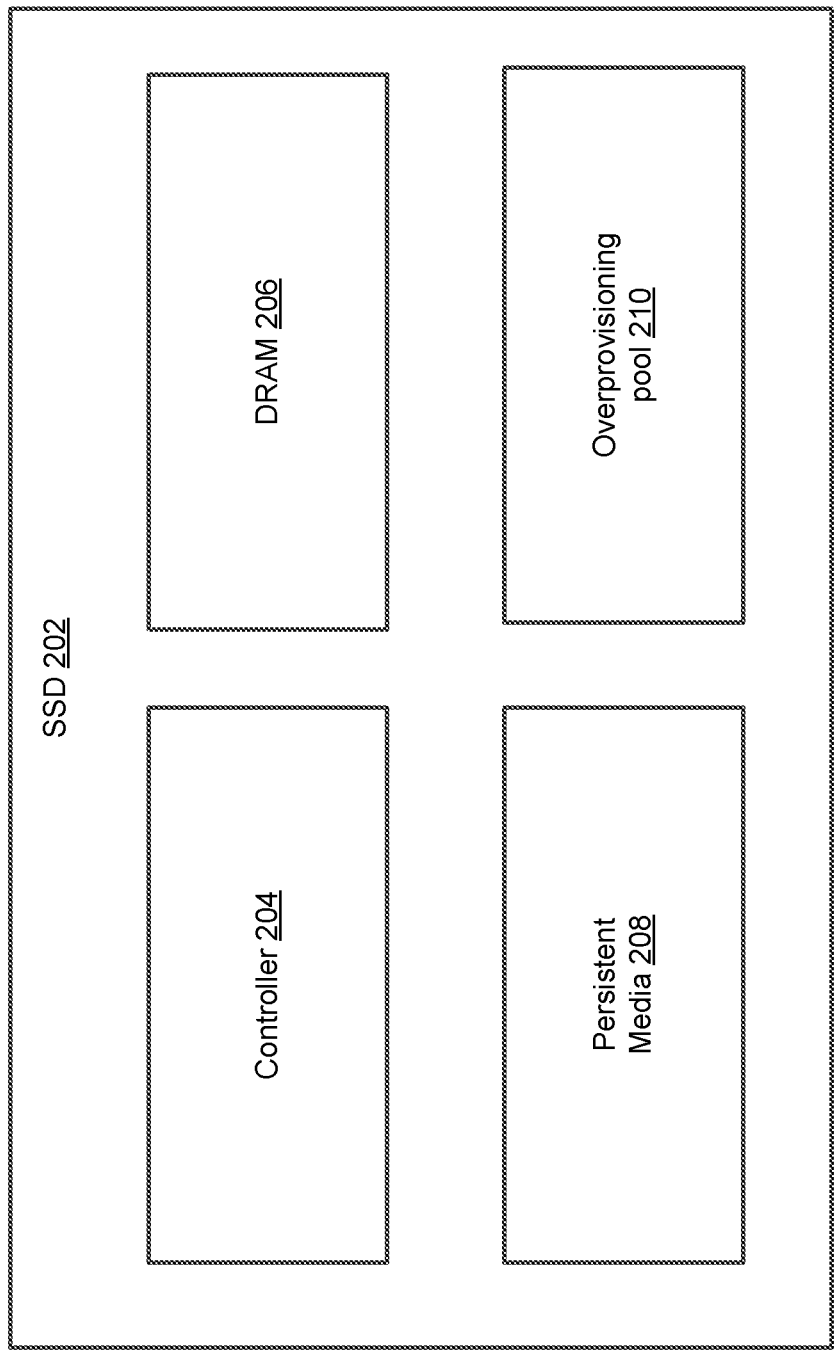
FIG. 2 shows an example storage device in accordance with the present disclosure.

FIG. 2 shows an example storage device 202 in accordance with the present disclosure. The storage device 202 may be, for example, a solid-state drive (SSD). The storage device 202 may comprise a complex architecture that includes a persistent media 208, an overprovisioning pool 210, a controller 204 and firmware, internal volatile memory, such as dynamic random-access memory (DRAM) 206, and an interaction interface with a host. The persistent media 208 may degrade due to continued read/write/erase operations. Such degradation may cause recovered and unrecovered read/write/erase errors. Some errors may be corrected using error-correction circuitry and/or specialized software logic (recovered errors).

Sometimes, unrecovered errors may be exposed to the host. Software logic may be configured to manage such issues by recovering data from backup(s) and/or snapshots. Unrecoverable write/erase errors may cause part of the persistent media 208 (e.g., a particular erase block) to be excluded from use for further storage of data or metadata. The overprovisioning pool 210 may be used to re-map the physical sector(s) into another area of the persistent media 208.

The overprovisioning pool 210 comprises only a limited number of erase blocks. As such, the overprovisioning pool 210 may be completely used or exhausted. If the storage device 202 is running out of the overprovisioning pool 210, the storage device 202 may soon fail. The circuitry and firmware of the controller 204 may introduce malfunctioning or expose some hardware or software bugs that may contribute to failure of the storage device 202. Further, the DRAM 206 may cause some issues that can contribute to failure of the storage device 202. The interface of interaction with the host (e.g., the host 102) may also contribute to failure of the storage device 202. However, the majority of failures can be characterized by the degradation of the persistent media 208. As a result, tracing the gradual degradation of the persistent media 208 may help to predict potential failure of the storage device 202 and the time of such failure.

Figure 3:
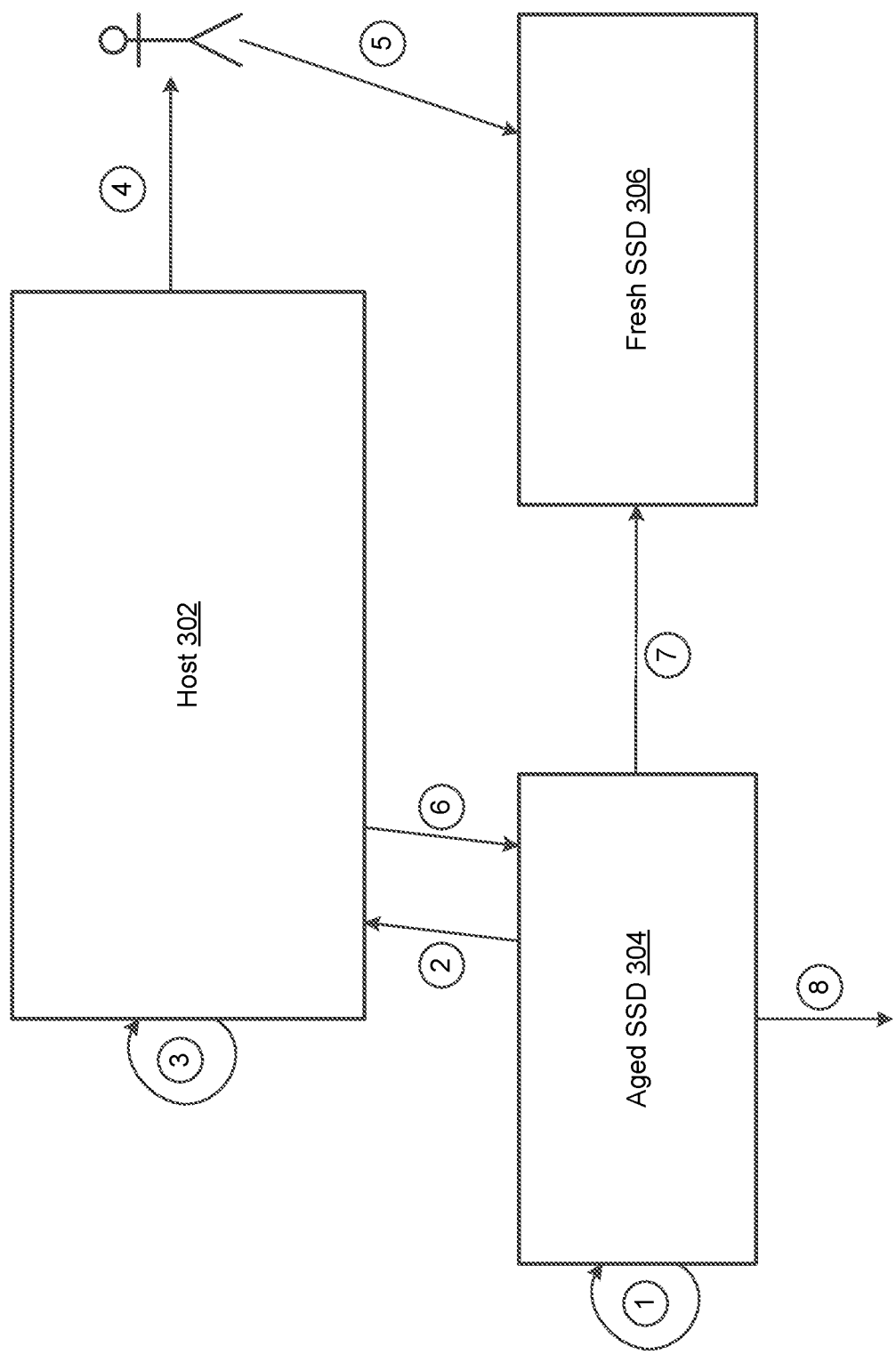
FIG. 3 shows an example system for storage device failure prediction in accordance with the present disclosure.

FIG. 3 shows an example system 300 for storage device failure prediction. Unexpected storage device failure may inevitably cause undesirable service(s) downtime. During such downtime, software services may be incapable of processing user requests. Human personnel intervention may be required to return the services to an operational status. Thus, storage device failure may increase the TCO associated with data infrastructure. Storage device failure prediction may help to guarantee that services will always be online. Thus, storage device failure prediction technique(s) may significantly decrease the TCO associated with data infrastructure.

The storage device (e.g., an aged storage device, such as an aged SSD 304) may comprise a subsystem configured to estimate and/or predict the time or duration of reliable operations associated with the storage device. At numeral 1, the aged SSD 304 may estimate and/or predict the remaining duration (e.g., time) of reliable operations associated with the aged SSD 304. At numeral 2, the aged SSD 304 may share this estimation on a periodic basis with the dedicated software subsystem of a host 302. The software subsystem of the host 302 may aggregate failure prediction information from multiple storage devices. At numeral 3, the host 302 may utilize the failure prediction information to elaborate a strategy for distributing the input/output (I/O) load amongst the storage devices. The host 302 may also utilize the failure prediction information to build a strategy for storage device decommissioning.

At numeral 4, the host 302 may inform an agent about the necessity to prepare a fresh SSD 306. The agent may comprise a human agent (e.g., human personnel) and/or a virtual agent. The agent may evaluate, accept, and correct the problem based on receiving the message from the host 302. The responsibility of the agent will be to install enough fresh storage devices in the system. For an automated agent, a robotic arm can remove the failed storage devices and exchange them for fresh ones from the physical pool of storage devices. Such architecture can manage adding/decommissioning the storage devices in a completely automated mode. The responsibility of human personnel will be of keeping the pool of fresh storage devices replenished and discarding/repairing the failed storage devices. At numeral 5, the agent may add one or more fresh SSDs, including the fresh SSD 306, into the system. At numeral 6, the host 302 may initialize the migration of data from the aged SSD 304 into the fresh SSD 306. At numeral 7, the data may be migrated from the aged SSD 304 to the fresh SSD 306. At numeral 8, the aged SSD 304 may be decommissioned.

Figure 4:
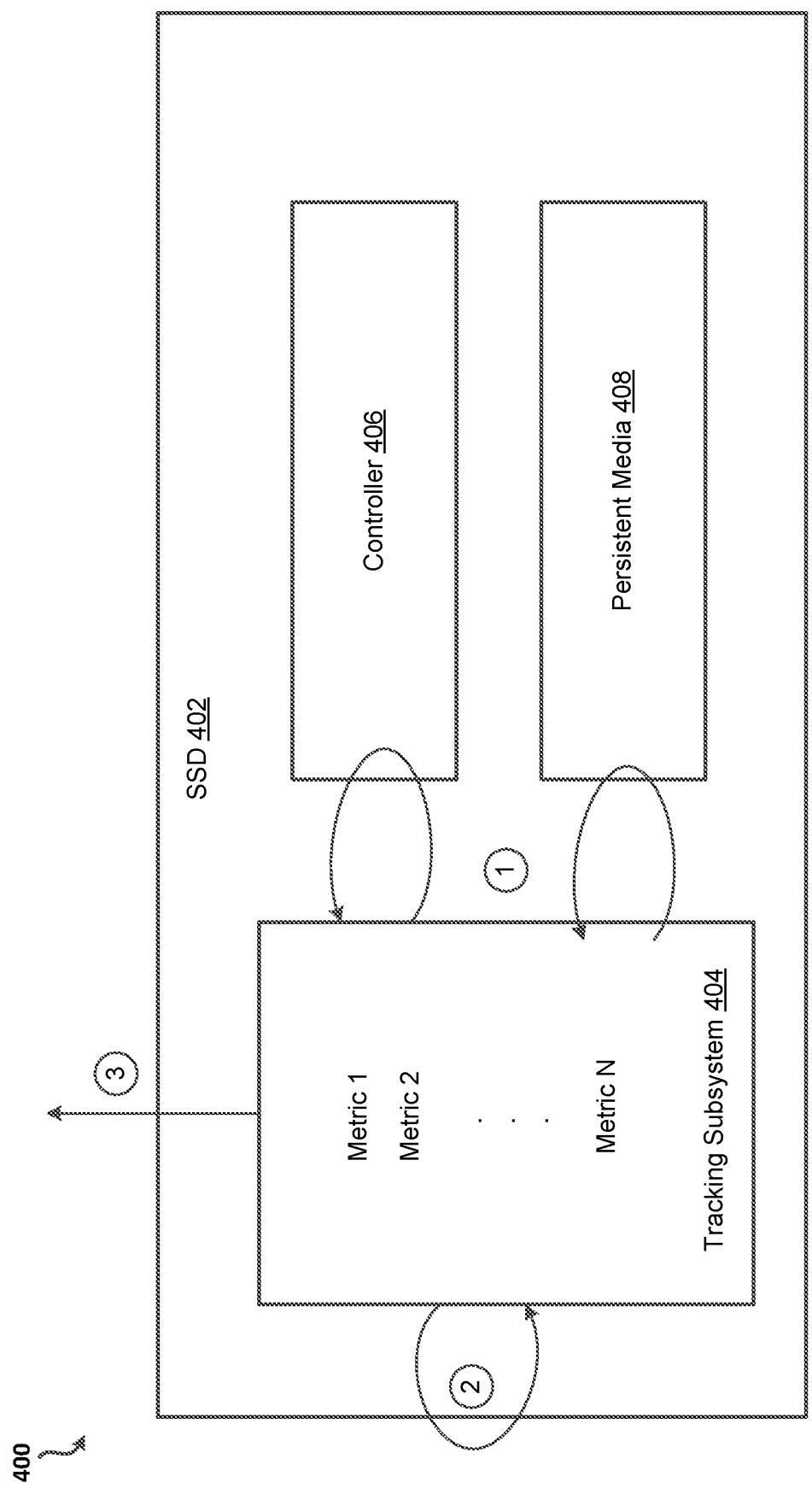
FIG. 4 shows an example system for storage device failure prediction in accordance with the present disclosure.

FIG. 4 shows an example system 400 for storage device failure prediction in accordance with the present disclosure. A storage device 402 may comprise a controller 406, a persistent media 408, and a tracking subsystem 404. The storage device 402 may be a SSD. The controller 406 and the persistent media 408 are two of the most important sources of potential failure for the storage device 402. The state of these components may be tracked to predict the remaining duration of reliable operations associated with the storage device 402.

At numeral 1, the tracking subsystem 404 may collect data from the controller 406 and the persistent media 408. The persistent media 408 may be characterized by multiple metrics (e.g., total number of valid and bad erase blocks, total number of used and free erase blocks, number of corrected and uncorrected errors, timeout errors, latency of operations, etc.). The controller 406 may comprise specialized subsystems that can measure or estimate various metrics with the goal to track the health state of the controller 406. The metrics associated with the persistent media 408 and the controller 406 may be collected by the tracking subsystem 404. The tracking subsystem 404 may comprise a dedicated registers set and/or volatile or non-volatile memory. At numeral 2, the tracking subsystem 404 may be configured to analyze the data and make predictions regarding the potential failure and/or duration of reliable operations associated with the storage device 402. At numeral 3, the forecast and/or prediction results may be shared with the host (e.g., the host 102). The forecast and/or prediction results may be used to elaborate the management policy and data on storage devices. The host may share the management policy with end-user(s) and/or specialized hardware/software subsystems.

Figure 5:
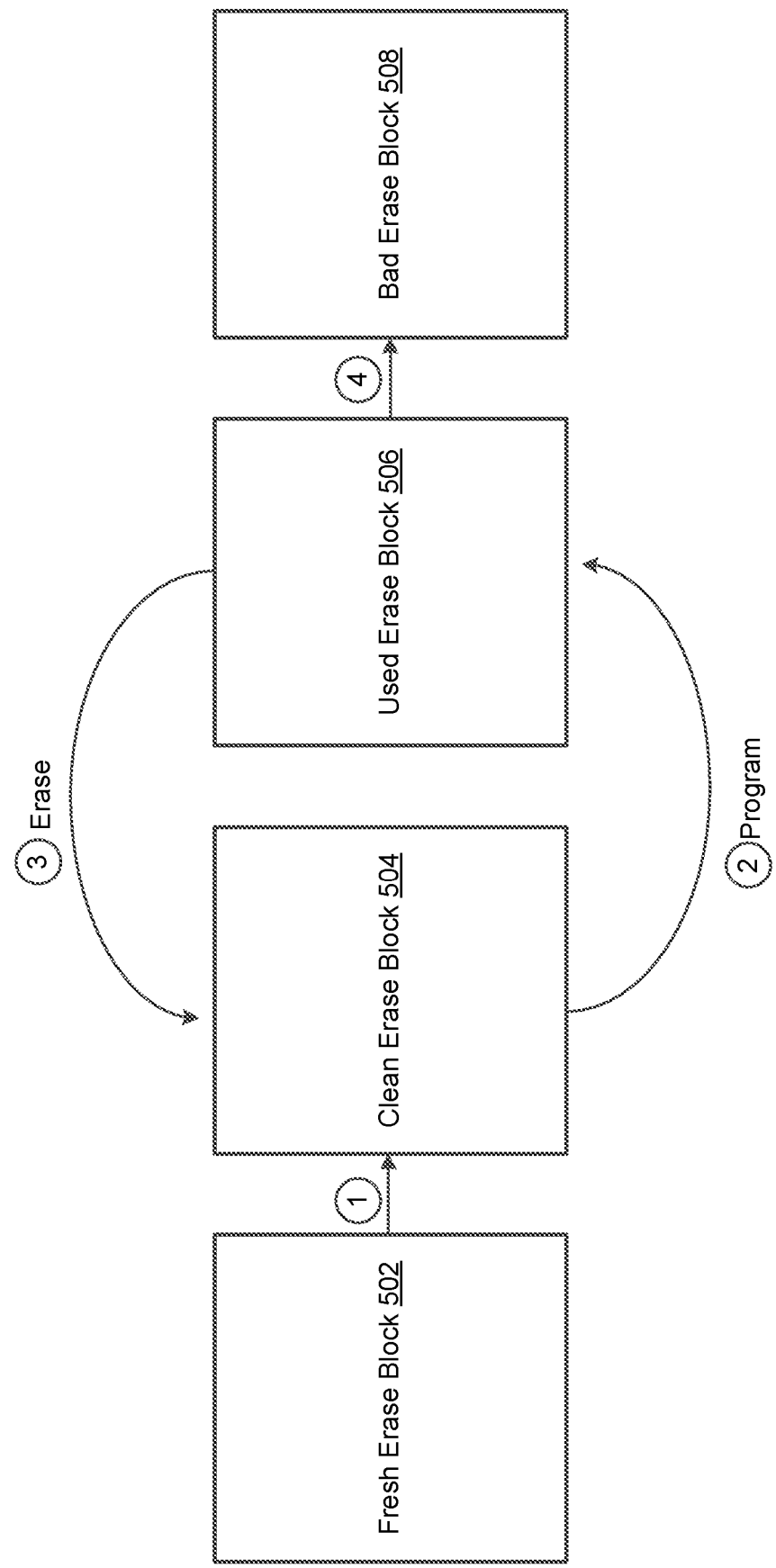
FIG. 5 shows an example model of NAND flash aging in accordance with the present disclosure.

FIG. 5 shows an example framework 500 of NAND flash aging in accordance with the present disclosure. Persistent media may degrade during read/write operations. For a NAND flash, every erase block may be erased a limited number of times before the erase block eventually becomes a bad erase block. Further, an erase blocks may be considered to be a bad erase block if program or write operation cannot be ended without errors. The charge in the cells may leak away over time. Read operations may accelerate this process. Thus, data may need to be periodically moved to prevent data loss. Such data moving operations that are running in the background may lead to increased erase operations.

The lifetime of an erase block may be described by the following steps. At numeral 1, a fresh erase block 502 may be taken from a pool of clean erase blocks. The fresh erase block 502 taken from the pool of clean blocks may become a clean erase block 504. At numeral 2, the clean erase block 504 may receive program/write NAND flash pages operations. For example, data may be programed or written into the NAND page of the clean erase block 504. Once the clean erase block 504 receives the receive program/write NAND flash pages operations, the clean erase block 504 may become a used erase block 506. The used erase block 506 may store data. Over time, the data stored in the used erase block 506 may become obsolete and/or invalidated. At numeral 3, an erase operation may be applied on the used erase block 506 with the obsolete and/or invalidated data. For example, the used erase block 506 may receive the erase operation after invalidation or moving all valid data. These steps may be repeated multiple times until a program is unrecoverable or an erase operation error occurs. If a program is unrecoverable or an erase operation error occurs, at numeral 4, the used erase block 506 may be excluded from usage. If the used erase block 506 is excluded from usage, the used erase block 506 may become a bad erase block 508. The bad erase block 508 may be placed into a bad block pool. The above explained lifetime of NAND flash erase may be used as a basis to estimate the duration of reliable operations and to predict the failure of storage devices.

Figure 6:
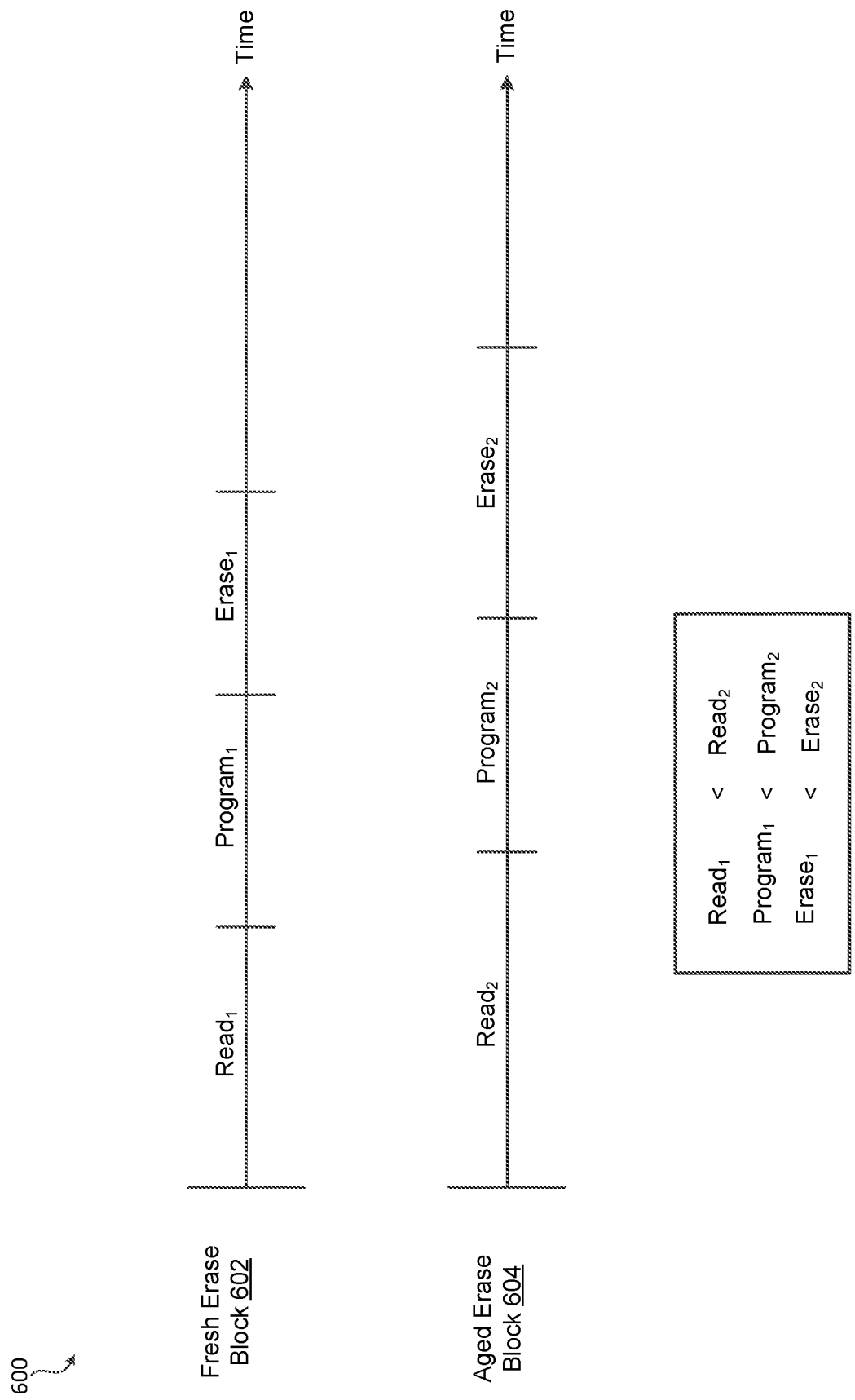
FIG. 6 shows an example system for storage device failure prediction using latency of operations in accordance with the present disclosure.

FIG. 6 shows an example system 600 for storage device failure prediction using latency of operations in accordance with the present disclosure. The controller of a storage device may require some time (e.g., latency) to execute the read/program/erase operations. Because operations with persistent media require time to change the physical state of the matter, the controller may execute any operation as a sequence of steps. The operations may be executed using several iterations. The iterations may include error correction, for example. Aged persistent media requires more iterations to execute operations, introduces more recoverable (and unrecoverable) errors, and can keep data safely for a shorter time before the data needs to be moved and the erase operation needs to be executed.

The degradation of persistent media may cause growing latency of read/program/erase operations. As shown in FIG. 6, the aged SSD 604 requires more time to execute each of the read, program, and erase operations than the fresh SSD 602 does. This latency may grow until erase block becomes incapable of finishing the erase operation without error (e.g., until the erase block becomes a bad erase block). Thus, the latency of read/program/erase operations may be a direct metric of the degradation state of the persistent media. The latency threshold value for erase blocks to become a bad block may be estimated. The estimation of latency growth rate may be used to estimate the duration of reliable operations and the potential time point of erase blocks becoming bad erase blocks. Thus, predicting the failure time point of the storage device may comprise comparing the capacity of erase blocks with a growing number of bad blocks. NAND flash may recover and latency may vary amongst different NAND dies (and amongst erase blocks inside of the same NAND die). A statistical distribution of latency values may be typical.

Figure 7:
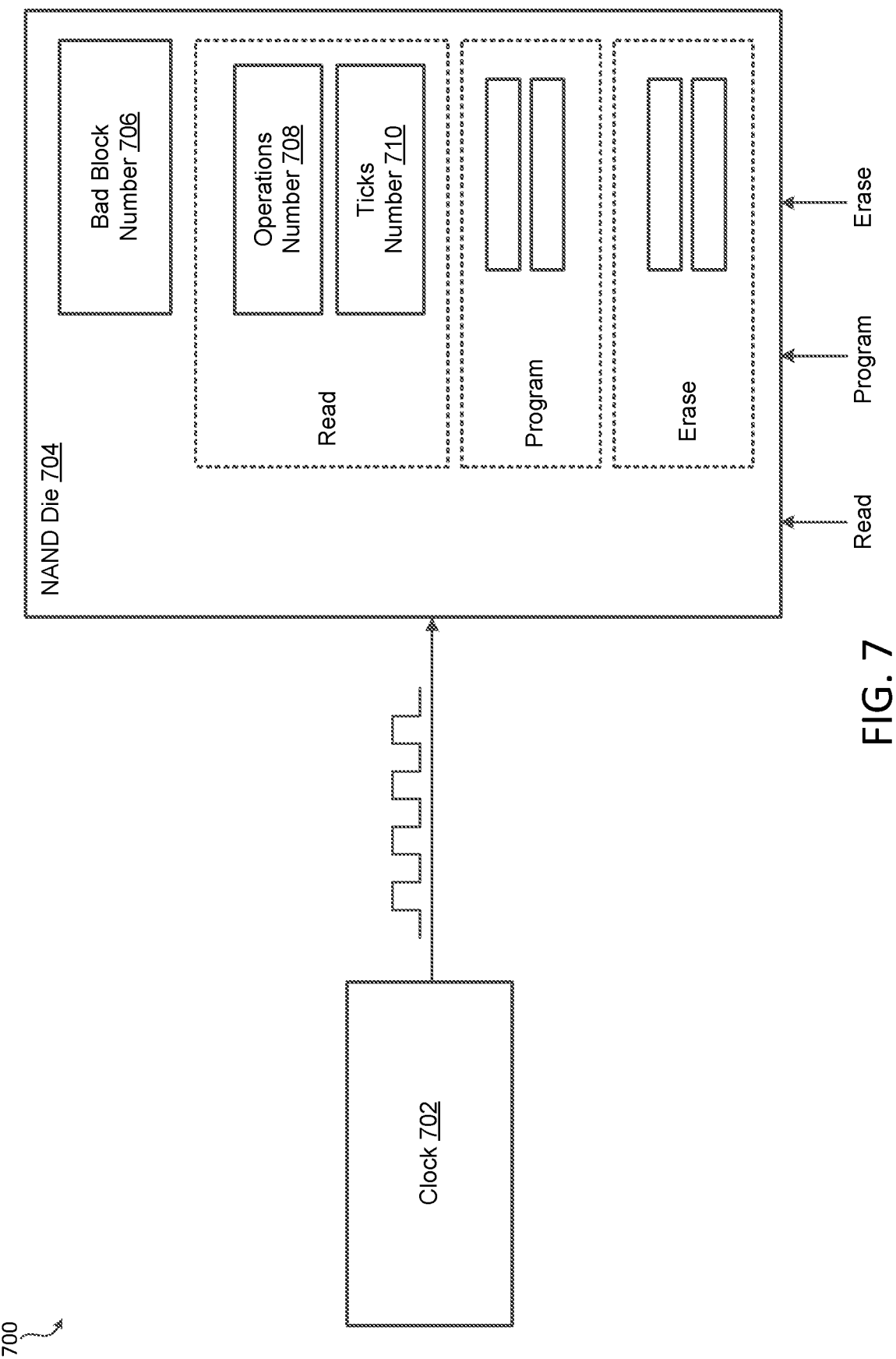
FIG. 7 shows an example system for measurement and statistics gathering in accordance with the present disclosure.

FIG. 7 shows an example system 700 for measurement and statistics gathering in accordance with the present disclosure. The NAND die is the fundamental basic unit of any SSD storage device. An SSD may comprise dozens or hundreds of NAND dies. A flash translation layer (FTL) associated with an SSD may try to distribute the wearing of NAND flash evenly amongst the plurality of NAND dies. There may be an overprovisioning pool that may be represented by one or several NAND dies dedicated to exchanging bad blocks from the main pool. Additionally, NAND dies in the main pool may be associated with a variation of physical characteristics that result in different speeds of NAND flash aging. The NAND die may be the basic unit of measurement for various metrics (e.g., latency of operations).

While latency may be measured using time measurement, as described above with regard to FIG. 6, a clock 702 (e.g., timing mechanism) may additionally, or alternatively, be used to measure latency. The clock 702 may be part of an SSD. The clock 702 may comprise any circuitry capable of generating ticks by even intervals (e.g., a quartz crystal oscillator). The clock 702 may generate ticks and the NAND die 704 may calculate the number of ticks for a particular operation. The NAND die 704 may estimate the metrics for read, program, and erase operations using one or more dedicated statistic subsystems. Each of the subsystem(s) may determine an operations number 708 for the measurement period and a total tick number 710 for the measurement period. The NAND die 704 may start to measure the operations number 708 and the total number of ticks 710 after initialization and until the operation statistics are read by an external subsystem. All statistics subsystems may be initialized after the reading by the external subsystem. The NAND die 704 may further comprise a counter of bad blocks 706. The counter 706 may account for (e.g., indicate the number of) the erase blocks converted into a bad state during the NAND die lifetime.

Figure 8:
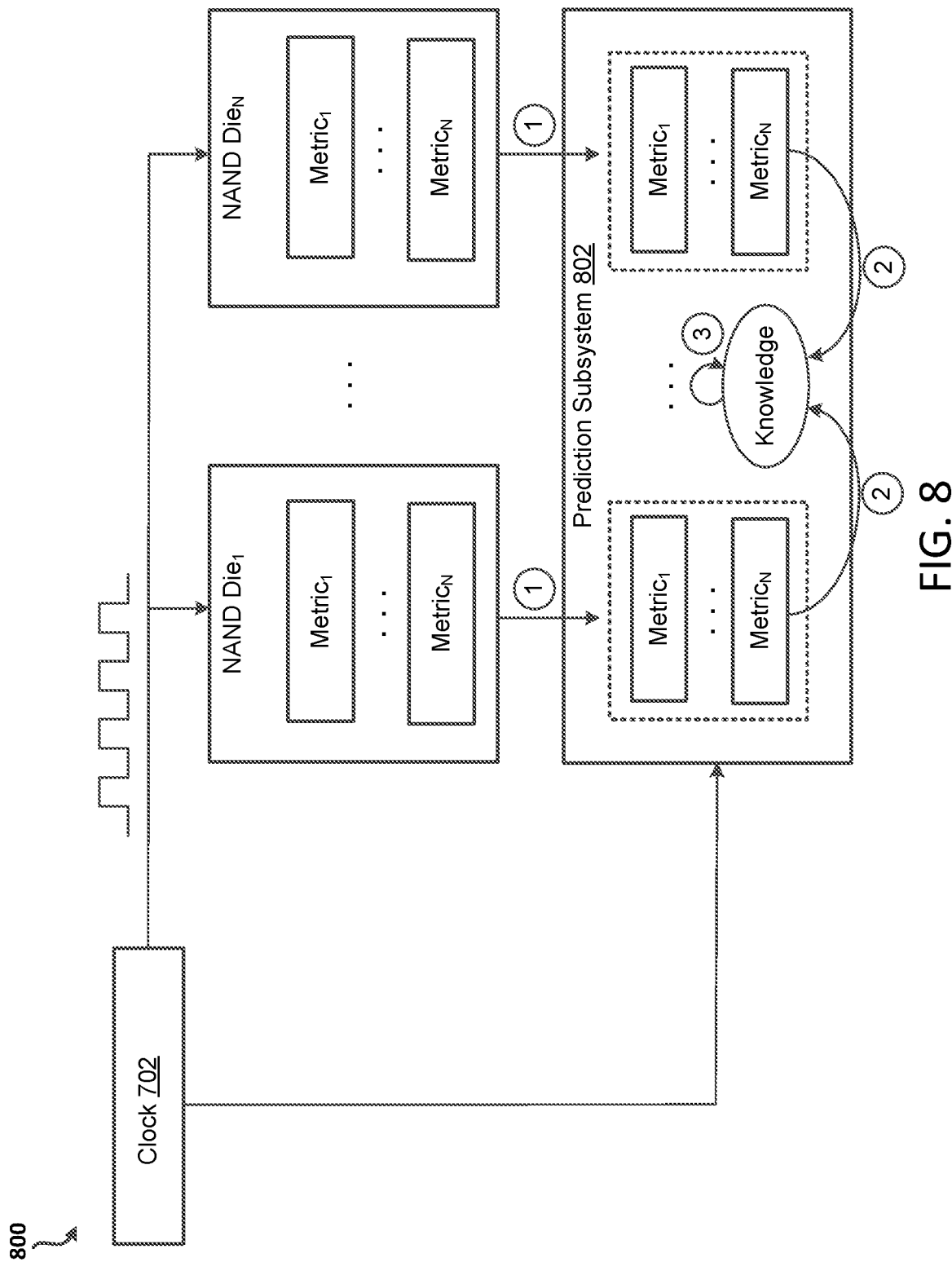
FIG. 8 shows another example system for measurement and statistics gathering in accordance with the present disclosure.

FIG. 8 shows another example system 800 for measurement and statistics gathering in accordance with the present disclosure. As described above, an SSD storage device contains multiple NAND dies (e.g., NAND $Die_1$-NAND $Die_N$). The SSD may comprise a special prediction subsystem 802. At numeral 1, the prediction subsystem 802 may be configured to gather statistical data from each of the multiple NAND dies. The prediction subsystem 802 may be configured to read statistical data periodically. At numeral 2, the prediction subsystem 802 may analyze the statistical distribution of the data from each of the NAND dies. At numeral 3, the prediction subsystem 802 may make the prediction of reliable operations and time point of potential failure of the storage device.

Figure 9:
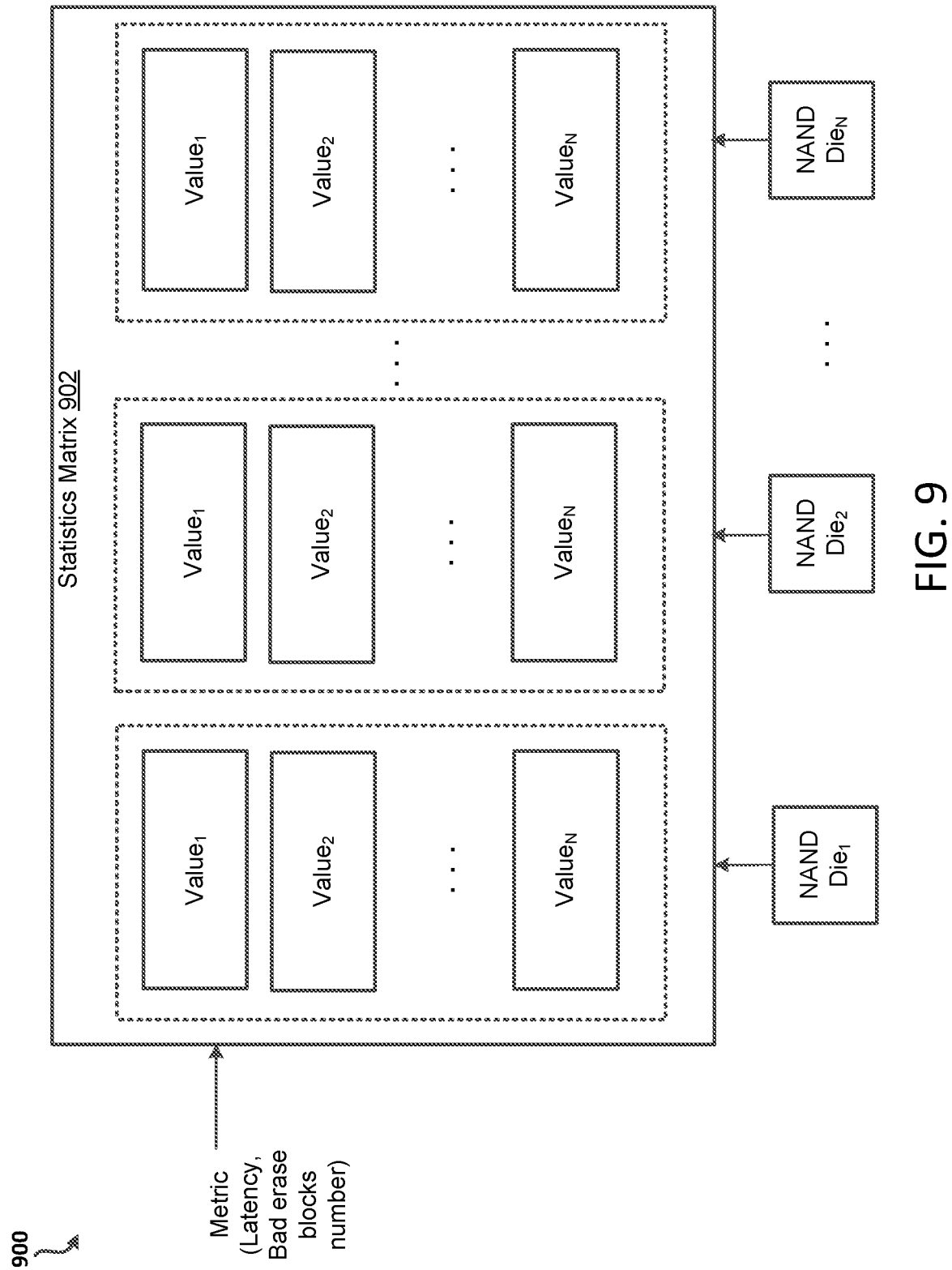
FIG. 9 shows an example system for keeping and analyzing statistics in accordance with the present disclosure.

FIG. 9 shows an example system 900 for keeping and analyzing statistics in accordance with the present disclosure. An SSD storage device may comprise a set of NAND dies. Each of the NAND dies may comprise a special subsystem that gathers statistics for tracking a set of metrics. The metrics may comprise a number of bad block(s), a number of read operations, a total latency of read operations, a number of program/write operations, a total latency of program/write operations, a number of erase operations, and/or a total latency of erase operations. The storage device may comprise a special set of volatile registers or persistent memory (e.g., NOR flash or MRAM memory). The special set of volatile registers or persistent memory may be configured to store and analyze the aggregated statistics of multiple NAND dies. The special subsystem may extract statistical data from multiple NAND dies on regular basis and compare the extracted data with values already stored in a register matrix (e.g., a statistics matrix 902). This comparison operation may be the basis for the elaboration tendency of NAND flash aging and the prediction of potential failure. The statistics matrix 902 may use only a limited (e.g., small) size of memory. Otherwise, the storage device may be too costly. Thus, in some examples, statistical data for one NAND die may keep only several sequential values. However, different NAND dies create statistical distribution of values that provides the basis for valuable analysis and making the prediction of a storage device.

FIG. 10 shows an example framework 1000 for keeping and analyzing statistics in accordance with the present disclosure. The number of bad erase blocks is one of the most important metric because it shows the balance between bad and valid erase blocks. Every NAND die has a limited number of erase blocks. Thus, the current number of bad erase blocks and the speed of bad block number growth may be used to estimate how soon the available number of valid blocks may be exhausted.

However, knowledge of the number of bad erase blocks alone may not provide a good basis for estimation of bad block growth because of non-linear dependency between the number of bad erase blocks and NAND flash aging. Latency of operations may provide a reliable basis for the estimation of bad block growth because latency is the direct physical characteristic of NAND flash aging. The latency of operations method may be based on the regular extraction of metric values from NAND dies. The metric values may comprise one or more of a number of bad block(s), a number of read operations, a total latency of read operations, a number of program/write operations, a total latency of program/write operations, a number of erase operations, and a total latency of erase operations. Every measurement may contain a number of bad erase blocks and the latency or latencies of the operation(s).

The prediction subsystem may keep the values of several recent sequential measurements (e.g., 3-10 recent sequential measurements). Storing limited sequence(s) may truncate the data prematurely. To avoid any extra storage costs, the subsystem may store aggregated metrics that may be used to calculate statistics for a longer stream. For example, the total sum ($\Sigma x$) and number of values (N) may be collected as scalar values which can be used to periodically calculate the mean: $\Sigma x/N$. Additionally, the sum of square values ($\Sigma x^2$) can be aggregated to get the standard deviation with $\Sigma x$ and N as shown below:

$$\sigma = \sqrt{\overline{x^2} - (\overline{x})^2} = \sqrt{\frac{\sum x^2}{N} - \left(\frac{\sum x}{N}\right)^2}.$$

The min and max may be updated for every new data point received. In some examples, in total, only five scalar values (N, $\Sigma x$, $\Sigma x^2$, min, max) need to be stored for each metric, instead of a long matrix.

Figure 11:
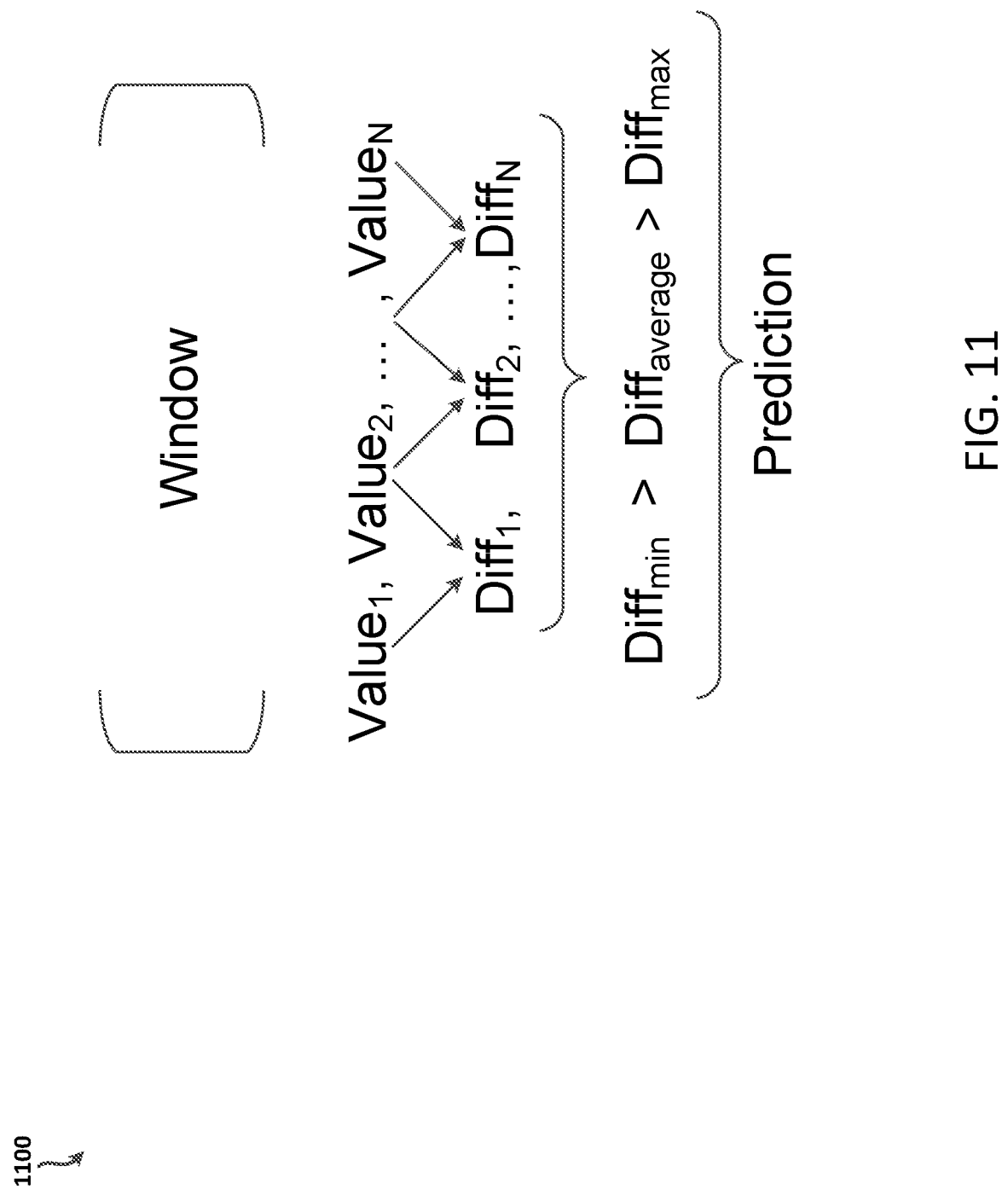
FIG. 11 shows an example system for storage device failure prediction using latency statistics analysis in accordance with the present disclosure.

FIG. 11 shows an example framework 1100 for storage device failure prediction using latency statistics analysis in accordance with the present disclosure. As discussed above with regard to FIG. 10, the prediction subsystem may keep the metric numbers of several recent sequential measurements. In examples, the comparison of the numbers of two sequential measurements may be performed. The comparison of the numbers of two sequential measurements may show how many bad erase blocks have been added and how latency has been increased between two sequential measurements. Thus, the threshold latency value to have a first bad erase block may be estimated. The value of latency increasing to have the next bad erase block may also be estimated. Further, the speed value of latency growth may be estimated. The prediction subsystem may use these several estimations to extract minimal, average, and maximum possible variations of latency increasing and prediction of the next bad erase block in each storage device.

Figure 12:
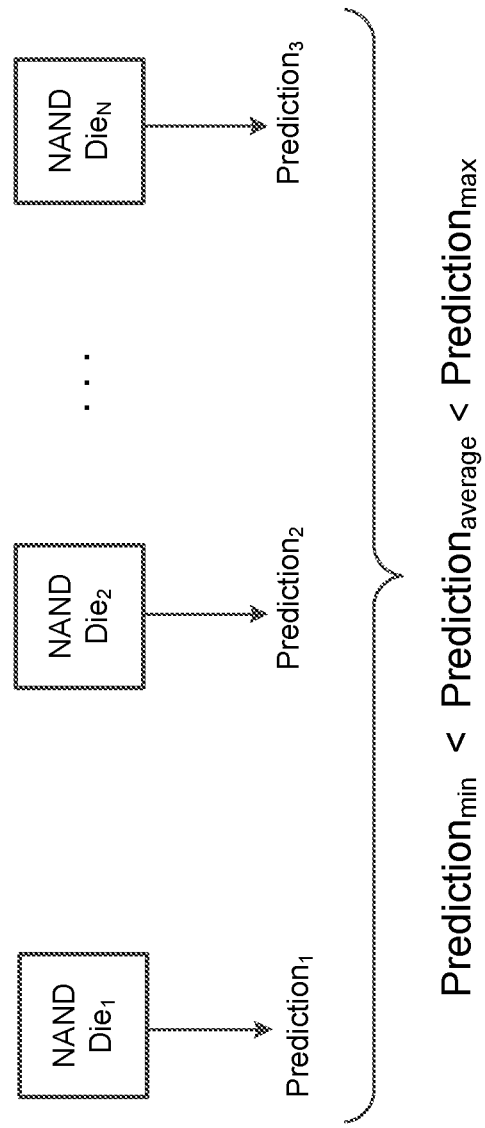
FIG. 12 shows another example system for storage device failure prediction using latency statistics analysis in accordance with the present disclosure.

FIG. 12 shows an example system 1200 for storage device failure prediction in accordance with the present disclosure. The estimations for different NAND dies in a storage device may be aggregated into the final values that the prediction subsystem of the storage device may use to forecast the duration of reliable operations and to predict the time point of potential failure. The prediction subsystem may use several estimations to extract minimal, average, and maximum possible variations of latency increasing and failure prediction.

FIG. 13 shows an example system 1300 for storage device failure prediction using latency statistics analysis in accordance with the present disclosure. Each NAND die, e.g., the NAND die 1301, may comprise three pools: clean erase blocks 1304, used erase blocks with data 1302, and bad erase blocks 1306. The aging of NAND flash causes the pool of bad erase blocks 1306 to grow gradually. A prediction subsystem may be configured to estimate how soon the pool of clean erase blocks 1304 will be exhausted by means of storing data or converting into bad erase block state. The prediction subsystem may estimate the minimal, average, and maximal values and use these values for calculating the minimal, average, and maximal thresholds of estimated failure of each NAND die. This prediction may be used to estimate how soon the next conversion into a bad erase block state would occur. The multiplication of the predicted value by the number of clean erase blocks (denoted as $B_{clean}$) may be used to estimate a total duration of reliable operations and a potential timepoint of failure of each NAND die. The duration of reliable operations may be estimated not in time units but in the number of read/program/erase operations.

In some examples, a latency growth rate (denoted as Latency_Growth_Rate) may be determined based on a latency increase within a time period divided by the time period, which may be represented by the formula: Latency_Growth_Rate=$(l_2-l_1)/(t_2-t_1)$. The latency growth may also be determined on the basis of per bad erase block, which is denoted as Latency_Growth_Per_Block. The Latency_Growth_Per_Block may be determined based on a latency increase divided by an increase of the number of bad blocks, which may be represented by the formular: Latency_Growth_Per_Block=$(l_2-l_1)/(n_2-n_1)$. The predicted value may be calculated by dividing of the Latency_Growth_ Per_Block by the Latency_Growth_Rate. Then, the estimated failure (i.e., predication) of each NAND die may be determined by multiplying the number of clean blocks ($B_{clean}$) and the quotient of Latency_Growth_Per_Block by Latency_Growth_Rate.

Figure 14:
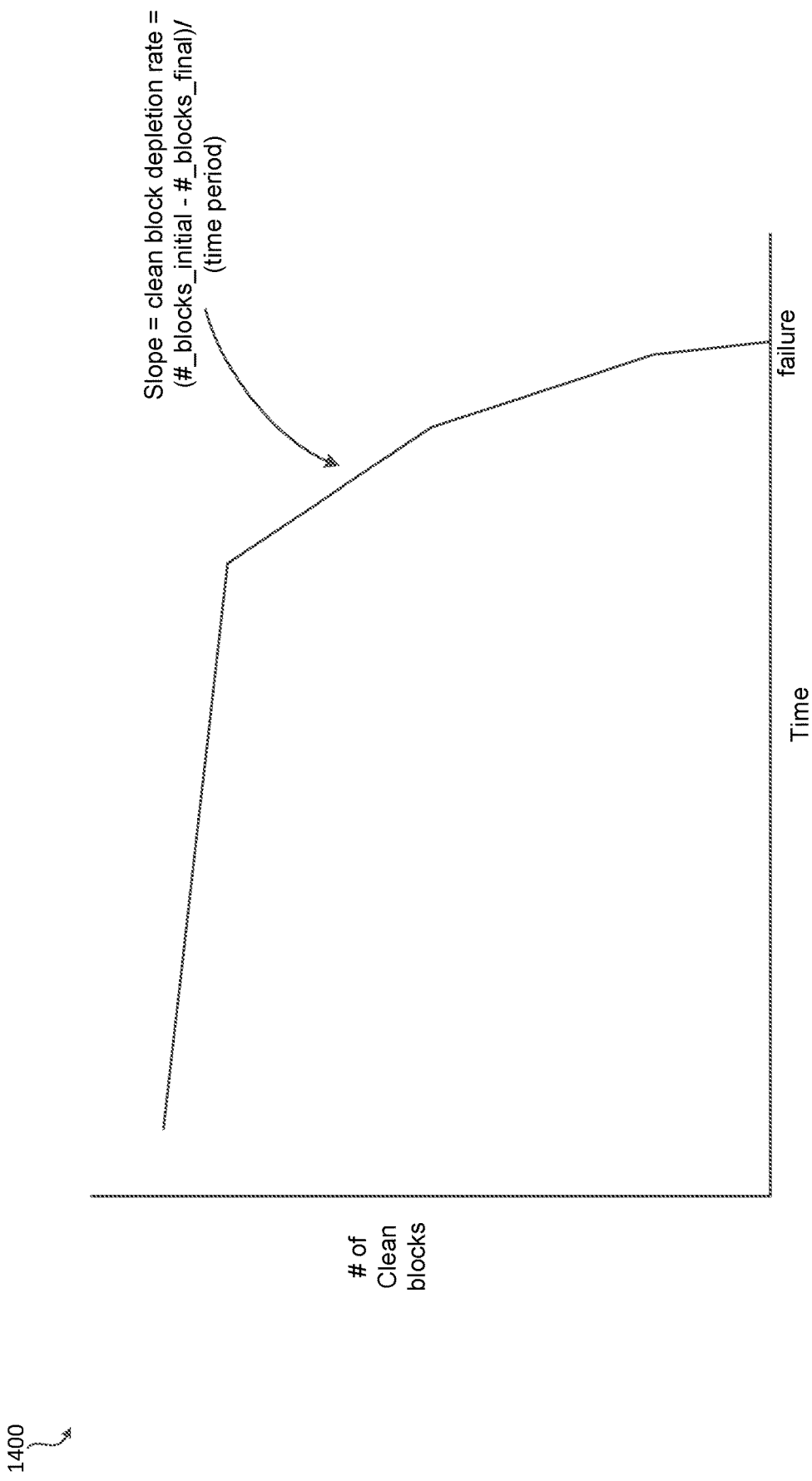
FIG. 14 shows an example graph for storage device failure prediction using clean block depletion in accordance with the present disclosure.

FIG. 14 shows an example graph 1400 depicting storage device failure prediction using clean block depletion in accordance with the present disclosure. As an alternative to using latency to predict storage device failure, the number of clean blocks in each NAND die of the storage device may be measured. The number of measured clean blocks may be used to estimate/predict failures of NAND dies in the storage device, thereby predicting a failure of the storage device. A clean block depletion rate (e.g., the slope of the graph 1400, which is related to uncorrectable error rate) may be estimated and used in conjunction with a number of remaining clean erase blocks to estimate the time remaining until a failure of each NAND die. The clean block depletion rate may be determined based on a difference of an initial number of clean blocks and a final number of clean blocks in a time period divided by the time period. That is, a clean block depletion rate=(an initial number of clean blocks−a final number of clean blocks in a time period)/the time period. A failure time point of each NAND die in the storage device failure may be predicted/estimated based on a ratio of a number of remaining clean blocks to a depletion rate of the clean blocks in a corresponding NAND die, i.e., a number of remaining clean blocks divided by a clean block depletion rate.

Figure 15:
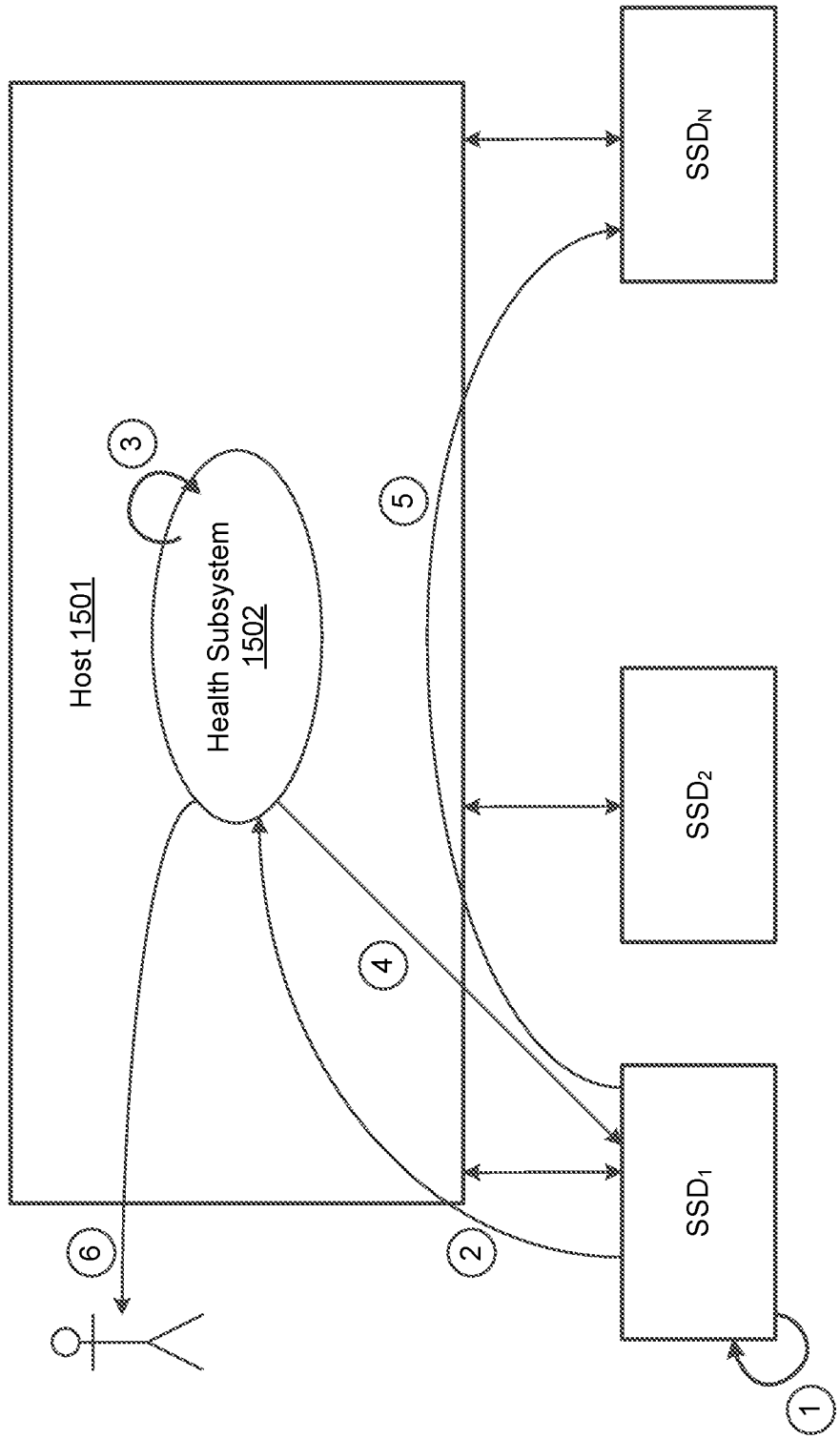
FIG. 15 shows an example system for host and storage device interaction to manage storage device failure prediction in accordance with the present disclosure.

FIG. 15 shows an example system 1500 for host and storage device interaction to manage storage device failure prediction in accordance with the present disclosure. At numeral 1, the storage device(s) may gather, analyze internal statistics, and make predictions of a time point(s) of potential storage device failure(s). The host 1501 may comprise a special health subsystem 1502. The special health subsystem 1502 may comprise a kernel-space or user-space. The special health subsystem 1502 may gather prediction data from all storage devices in the system. At numeral 2, the storage device(s) may inform the host 1501 (e.g., the health subsystem 1502) of the storage device failure prediction(s). At numeral 3, the health subsystem 1502 may analyze the statistics. For example, the predictions may be used by the health subsystem 1502 to elaborate a policy of data distribution amongst storage devices, data migration from to-be-failed devices into valid ones, and a storage device decommission policy. At numeral 4, the data migration may be initiated. At numeral 5, the data may be migrated. In some embodiments, the storage device decommission policy may be executed in automated mode. In other embodiments, human personnel may need to orchestrate and manage the activity of the storage device decommission. For example, human staff may manually add or/and remove storage devices to/from the system.

Figure 16:
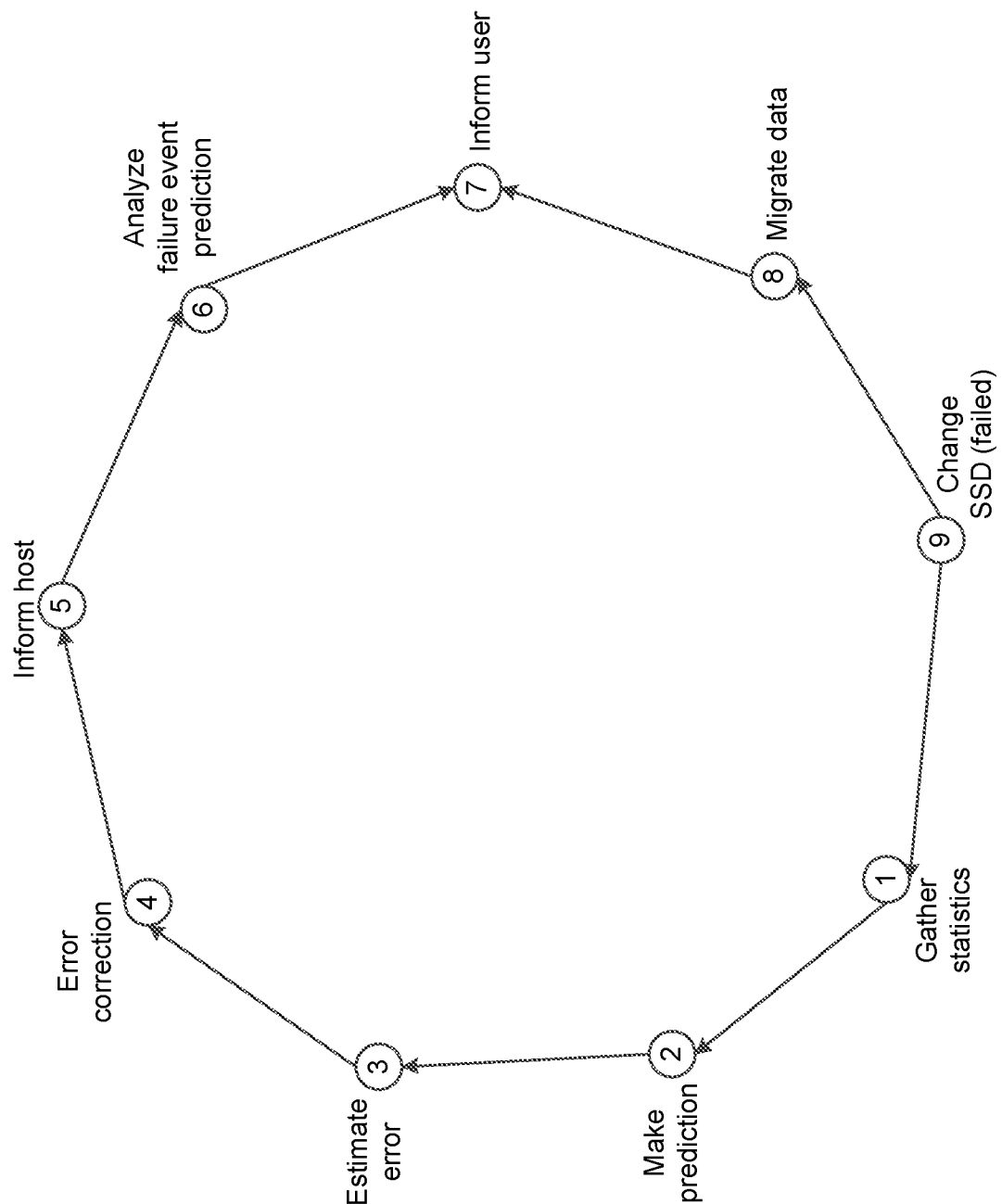
FIG. 16 shows an example system for data management using a failure prediction model in accordance with the present disclosure.

FIG. 16 shows an example system 1600 for data management using a failure prediction model in accordance with the present disclosure. At numeral 1, the storage device(s) may gather statistics. At numeral 2, the storage device(s) may analyze the statistics and make storage device failure prediction(s). At numeral 3, read/write/erase errors may be estimated. At numeral 4, error corrections may be executed. For example, read errors may be corrected using error-correction circuitry and/or specialized software logic. At numeral 5, the storage device(s) may inform the host. For example, the storage device(s) may estimate and/or predict the remaining duration (e.g., time) of reliable operations associated with each storage device. The storage device(s) may share the estimation(s) on a periodic basis with the dedicated software subsystem of the host. The software subsystem of the host may aggregate failure prediction information from multiple storage devices.

At numeral 6, the host may analyze the storage device failure event prediction(s). The host may utilize the failure prediction information to elaborate a strategy for distributing the input/output (I/O) load amongst the storage devices. The host may utilize the failure prediction information to build a strategy for storage device decommissioning. At numeral 7, the host may inform a user, if necessary. For example, the host may inform an agent about the necessity to prepare a fresh SSD. The agent may comprise a human agent (e.g., human personnel) and/or a virtual agent. The agent may evaluate, accept, and correct the problem(s) based on receiving the message from the host. The responsibility of the agent will be to install enough fresh storage devices in the system. For an automated agent, a robotic arm can remove any failed storage devices and exchange them for fresh ones from the physical pool of storage devices. Such architecture can manage adding/decommissioning storage device(s) in a completely automated mode. The responsibility of human personnel will be of keeping the pool of fresh storage devices replenished and discarding/repairing the failed storage device(s). The host may initialize the migration of data from the aged SSD into the fresh SSD. At numeral 8, the data may be migrated from the aged SSD to the fresh SSD. At numeral 9, the failed SSD may be changed. For example, the aged SSD may be decommissioned.

Thus, described herein is a method of predicting storage device failure(s). The techniques described herein exclude a storage device failure by predicting the duration of reliable operations and by exchanging a to-be-failed storage device for a valid one. The techniques described herein may guarantee that services will be online without an unexpected offline state because of failed storage device(s). The techniques described herein may decrease TCO cost by preventing storage device failures and keeping data safe. The techniques described herein may facilitate the elaboration of a policy of automated data migration and decommissioning of to-be-failed storage devices.

Figure 17:
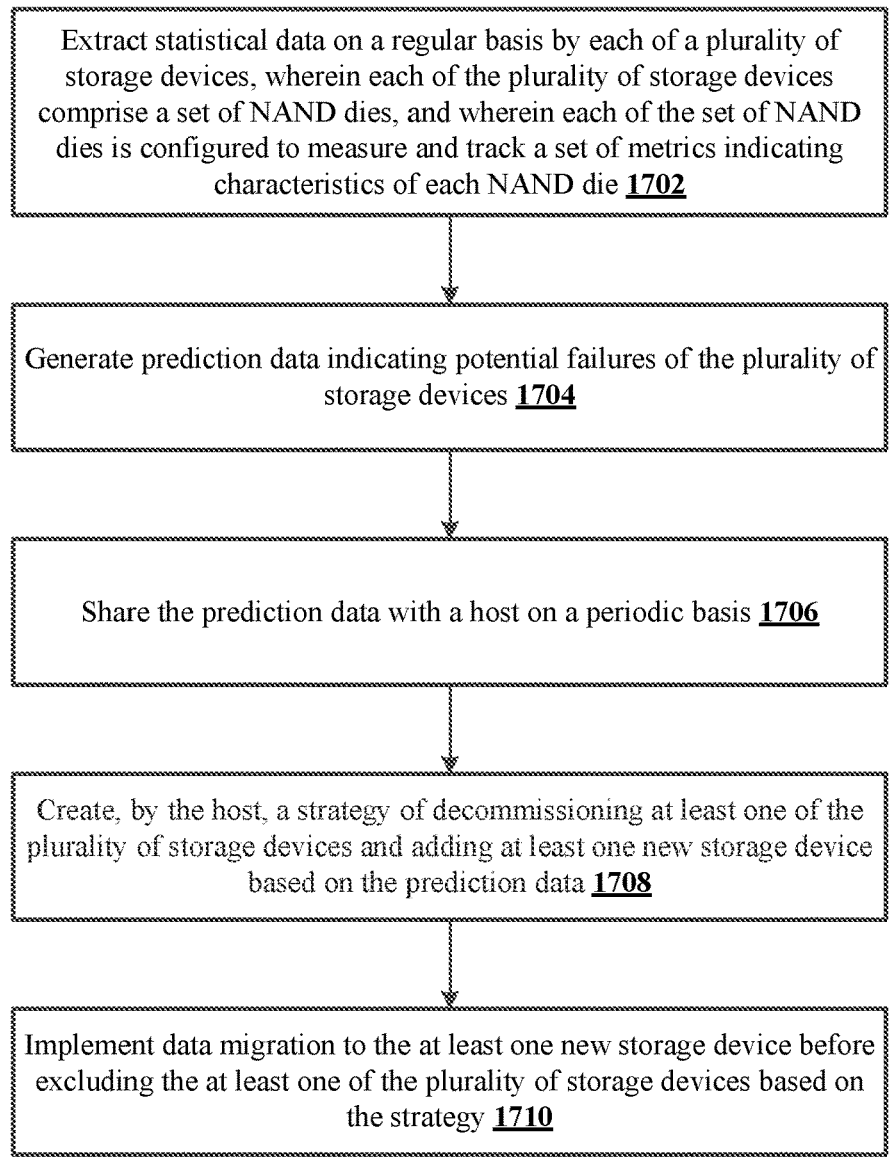
FIG. 17 shows an example process for guaranteeing online services which may be performed in accordance with the present disclosure.

FIG. 17 illustrates an example process 1700 for guaranteeing online services. Although depicted as a sequence of operations in FIG. 17, those of ordinary skill in the art will appreciate that various embodiments may add, remove, reorder, or modify the depicted operations.

At 1702, statistical data may be extracted on a regular basis. The statistical data may be extracted on the regular basis by each of a plurality of storage devices. Each of the plurality of storage devices may comprise a set of NAND dies. Each of the set of NAND dies may be configured to measure and track a set of metrics indicating characteristics of each NAND die. Each storage device may estimate and/or predict the remaining duration (e.g., time) of reliable operations associated with the corresponding storage device. At 1704, prediction data may be generated. The prediction data may be generated based on the extracted statistical data. The prediction data may indicate potential failures of the plurality of storage devices. Each storage device may share this estimation on a periodic basis with the dedicated software subsystem of a host. At 1706, the prediction data may be shared with a host. For example, the prediction data may be shared with the host on a periodic basis.

At 1708, a strategy may be created by the host. The strategy may comprise a strategy for decommissioning at least one of the plurality of storage devices and adding at least one new storage device based on the prediction data. For example, a software subsystem of the host may aggregate failure prediction information from multiple storage devices. The host may utilize the failure prediction information to build a strategy for storage device decommissioning. The host may initialize the migration of data from at least one to-be-failed storage device into at least one new storage device. At 1710, data migration to the at least one new storage device may be implemented. The data migration to the new storage device(s) may be implemented before excluding the at least one of the plurality of storage devices based on the strategy.

Figure 18:
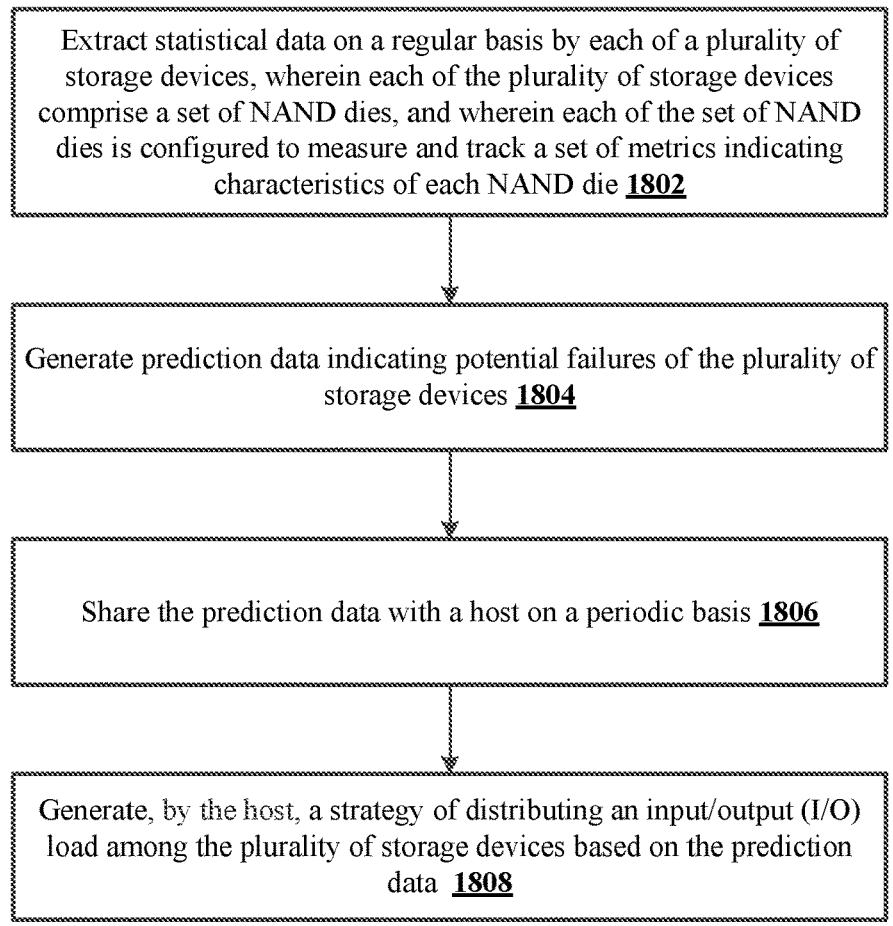
FIG. 18 shows an example process for guaranteeing online services which may be performed in accordance with the present disclosure.

FIG. 18 illustrates an example process 1800 for guaranteeing online services. Although depicted as a sequence of operations in FIG. 18, those of ordinary skill in the art will appreciate that various embodiments may add, remove, reorder, or modify the depicted operations.

At 1802, statistical data may be extracted on a regular basis. The statistical data may be extracted on the regular basis by each of a plurality of storage devices. Each of the plurality of storage devices may comprise a set of NAND dies. Each of the set of NAND dies may be configured to measure and track a set of metrics indicating characteristics of each NAND die. Each storage device may estimate and/or predict the remaining duration (e.g., time) of reliable operations associated with the corresponding storage device. At 1804, prediction data may be generated. The prediction data may be generated based on the extracted statistical data. The prediction data may indicate potential failures of the plurality of storage devices. Each storage device may share this estimation on a periodic basis with the dedicated software subsystem of a host. At 1806, the prediction data may be shared. The prediction data may be shared with the host on a periodic basis. At 1808, a strategy may be created by the host. For example, the host may utilize the failure prediction information to elaborate a strategy for distributing the input/output (I/O) load amongst the storage devices.

Figure 19:
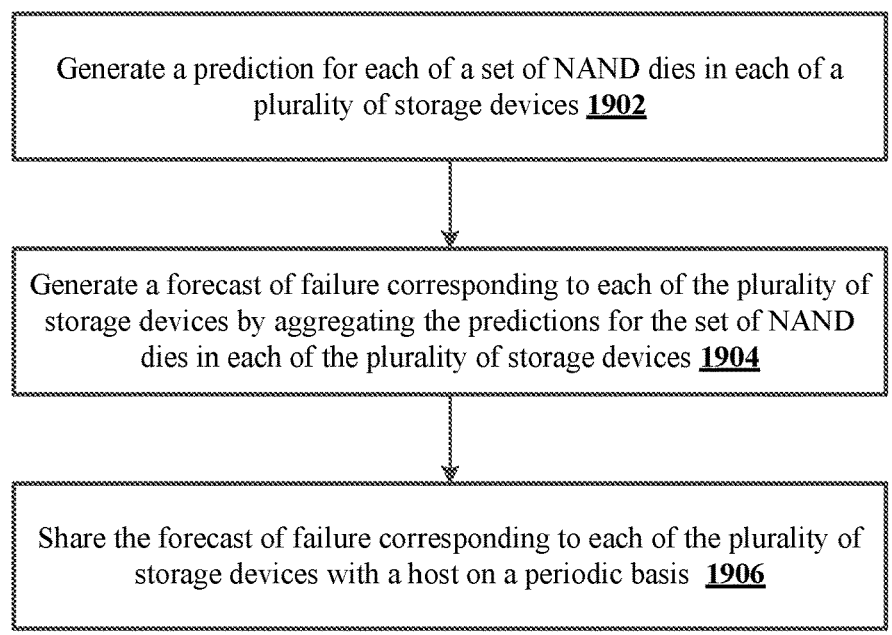
FIG. 19 shows an example process for guaranteeing online services which may be performed in accordance with the present disclosure.

FIG. 19 illustrates an example process 1900 for guaranteeing online services. Although depicted as a sequence of operations in FIG. 19, those of ordinary skill in the art will appreciate that various embodiments may add, remove, reorder, or modify the depicted operations.

An SSD storage device contains multiple NAND dies. Statistical data may be gathered from each of the multiple NAND dies. The statistical data may be read periodically. The statistical distribution of the data from each of the NAND dies may be analyzed. At 1902, a prediction may be generated for each of a set of NAND dies in each of a plurality of storage devices. The predictions for different NAND dies may be aggregated into the final values that a prediction subsystem of a corresponding storage device may use to forecast the duration of reliable operations and to predict the time point of potential failure associated with the corresponding storage device. At 1904, a forecast of failure corresponding to each of the plurality of storage devices may be generated. The forecast of failure may be generated by aggregating the predictions for the set of NAND dies in each of the plurality of storage devices. At 1906, the forecast of failure corresponding to each of the plurality of storage devices may be shared with a host on a periodic basis.

Figure 20:
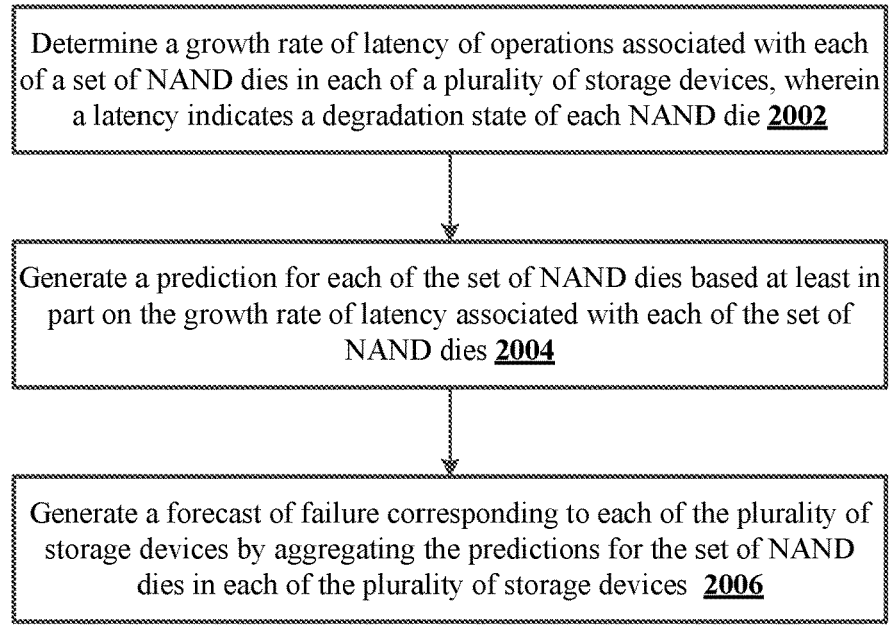
FIG. 20 shows an example process for generating failure forecasts for storage devices in accordance with the present disclosure.

FIG. 20 illustrates an example process 2000 for generating a failure forecast for a storage device. Although depicted as a sequence of operations in FIG. 20, those of ordinary skill in the art will appreciate that various embodiments may add, remove, reorder, or modify the depicted operations.

The controller of a storage device may require some time (e.g., latency) to execute the read/program/erase operations. Because operations with persistent media require time to change the physical state of the matter, the controller may execute any operation as a sequence of steps. The operations may be executed using several iterations. The iterations may include error correction, for example. Aged persistent media requires more iterations to execute operations, introduces more recoverable (and unrecoverable) errors, and can keep data safely for a shorter time before the data needs to be moved and the erase operation needs to be executed.

The degradation of persistent media may cause growing latency of read/program/erase operations. This latency may grow until erase block becomes incapable of finishing the erase operation without error (e.g., until the erase block becomes a bad erase block). At 2002, a growth rate of latency of operations associated with each of a set of NAND dies in each of a plurality of storage devices may be determined. The latency may indicate a degradation state of each NAND die. For example, the latency of read/program/erase operations may be a direct metric of the degradation state of the persistent media. The latency threshold value for erase blocks to become a bad block may be estimated. In examples, a growth rate of operation latency associated with each NAND die may be determined based on a latency increase within a time period divided by the time period. At 2004, a prediction for each of the set of NAND dies may be generated. The prediction may be generated based at least in part on the growth rate of latency associated with each of the set of NAND dies. For example, the predication of each NAND die may be determined by multiplying the number of clean blocks and the quotient of a latency growth per bad block by the growth rate of latency (i.e., the latency growth rate). At 2006, a forecast of failure corresponding to each of the plurality of storage devices may be generated. The forecast of failure may be generated by aggregating the predictions for the set of NAND dies in each of the plurality of storage devices.

Figure 21:
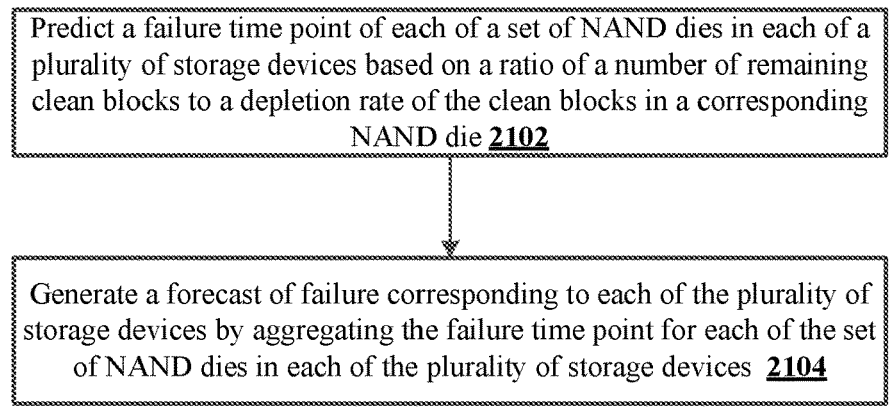
FIG. 21 shows another example process for generating failure forecasts for storage devices in accordance with the present disclosure.

FIG. 21 illustrates another example process 2100 for generating a failure forecast for a storage device. Although depicted as a sequence of operations in FIG. 21, those of ordinary skill in the art will appreciate that various embodiments may add, remove, reorder, or modify the depicted operations.

As an alternative to using latency to predict storage device failure, the number of clean blocks may be measured. The number of measured clean blocks may be used to estimate storage device failure predictions. At 2102, a failure time point of each of a set of NAND dies in each of a plurality of storage devices may be predicted. The failure time points may be predicted based on a ratio of a number of remaining clean blocks to a depletion rate of the clean blocks in a corresponding NAND die. For example, the clean block depletion rate may be estimated and used in conjunction with a number of remaining clean erase blocks to estimate the time remaining until a failure of each NAND die. The clean block depletion rate may be determined based on a difference of an initial number of clean blocks and a final number of clean blocks in a time period divided by the time period. A failure time point of each NAND die in the storage device failure may be predicted/estimated based on a ratio of a number of remaining clean blocks to a depletion rate of the clean blocks in a corresponding NAND die, i.e., a number of remaining clean blocks divided by a clean block depletion rate. At 2104, a forecast of failure corresponding to each of the plurality of storage devices may be generated. The forecast of failure may be generated by aggregating the predictions for the set of NAND dies in each of the plurality of storage devices.

Figure 22:
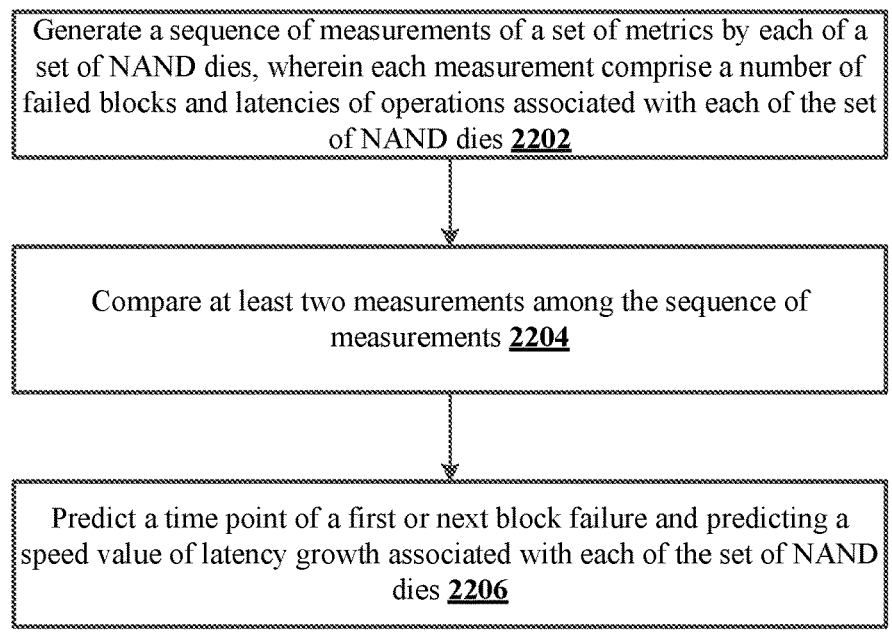
FIG. 22 shows an example process for performing predictions for NAND dies in accordance with the present disclosure.

FIG. 22 illustrates an example process 2200 for performing predictions for NAND dies. Although depicted as a sequence of operations in FIG. 22, those of ordinary skill in the art will appreciate that various embodiments may add, remove, reorder, or modify the depicted operations.

The number of bad blocks in each NAND die is one of the most important metric because it shows the balance between bad and valid erase blocks. Every NAND die has a limited number of erase blocks. Thus, the current number of bad erase blocks and the growth speed of bad block number may be used to estimate how soon the available number of valid blocks may be exhausted.

However, knowledge of bad erase block numbers alone may not provide a good basis for estimation of bad block number growth because of non-linear dependency between the number of bad erase blocks and NAND flash aging. Latency of operations may provide a reliable basis for the estimation of bad block number growth because latency is the direct physical characteristic of NAND flash aging. The latency of operations method may be based on the regular extraction of metric values from NAND dies. The metric values may comprise one or more of a number of bad blocks, a number of read operations, a total latency of read operations, a number of program/write operations, a total latency of program/write operations, a number of erase operations, and a total latency of erase operations. Every measurement may contain a number of bad blocks and the latency or latencies of the operation(s).

At 2202, a sequence of measurements of a set of metrics may be generated by each of a set of NAND dies. Each measurement may comprise a number of failed blocks and latencies of operations associated with each of the set of NAND dies. A prediction subsystem may keep the values of several recent sequential measurements (e.g., 3-10 recent sequential measurements).

At 2204, at least two measurements among the sequence of measurements may be compared. The comparison of the values in the two sequential measurements may show how many bad blocks have been added and how latency has been increased between the two measurements. The threshold latency value to have a first bad block may be estimated. The value of latency increasing to have a next bad erase block may also be estimated. Further, the speed value of latency growth may be estimated. The prediction subsystem may use several estimations to extract minimal, average, and maximum possible variations of latency increasing and to predict the next bad block.

At 2206, a time point of a first or next block failure may be predicted. Further, a speed value of latency growth associated with each of the set of NAND dies may be predicted. The estimations for different NAND dies may be aggregated into the final values that the prediction subsystem may use to forecast the duration of reliable operations and to predict the time point of potential failure of a storage device.

Figure 23:
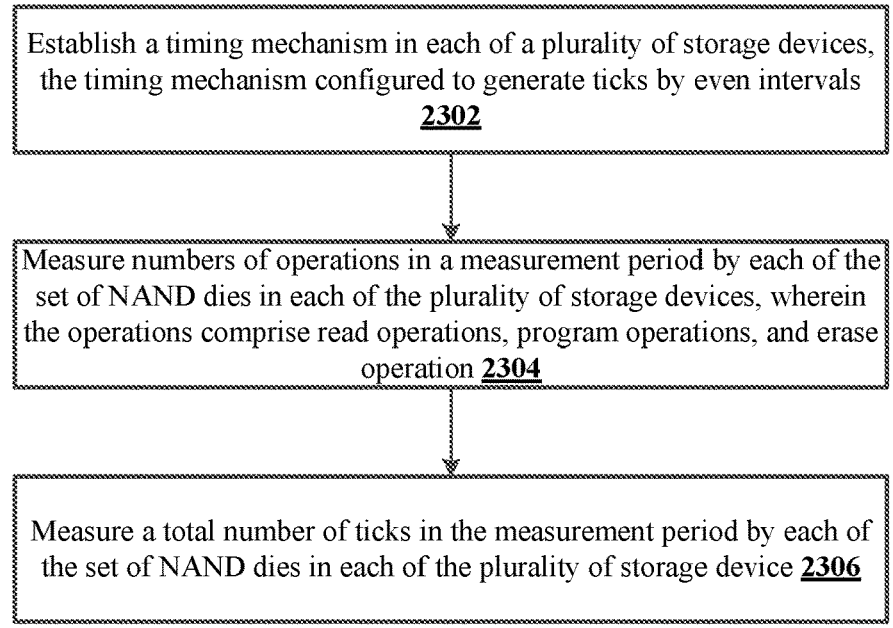
FIG. 23 shows an example process for establishing and applying a timing mechanism in storage devices which may be performed in accordance with the present disclosure.

FIG. 23 illustrates an example process 2300 for establishing and applying a timing mechanism in each storage device. Although depicted as a sequence of operations in FIG. 23, those of ordinary skill in the art will appreciate that various embodiments may add, remove, reorder, or modify the depicted operations.

A timing mechanism may be used to measure latency of operations. At 2302, a timing mechanism may be established in each of a plurality of storage devices. The timing mechanism may be configured to generate ticks by even intervals. The timing mechanism may comprise any circuitry capable of generating ticks by even intervals (e.g., a quartz crystal oscillator). The timing mechanism may generate ticks and the NAND die may calculate the number of ticks for a particular operation. The NAND die may estimate the metrics for read, program, and erase operations using one or more dedicated statistic subsystems. Each of the subsystem(s) may determine an operations number in a measurement period. At 2304, numbers of operations in a measurement period may be measured by each of the set of NAND dies in each storage device. The operations may comprise read operations, program operations, and erase operations. Each of the subsystem(s) may determine a total tick number for the measurement period. At 2306, a total number of ticks in the measurement period may be measured by each of the set of NAND dies in each of the plurality of storage device.

The NAND die may start to measure the operations number and the total number of ticks after initialization and until the operation statistics are read by an external subsystem. All statistics subsystems may be initialized after the reading by the external subsystem. The NAND die may further comprise a counter of bad blocks. The counter may account for (e.g., indicate the number of) the blocks converted into a bad state during the NAND die lifetime.

Figure 24:
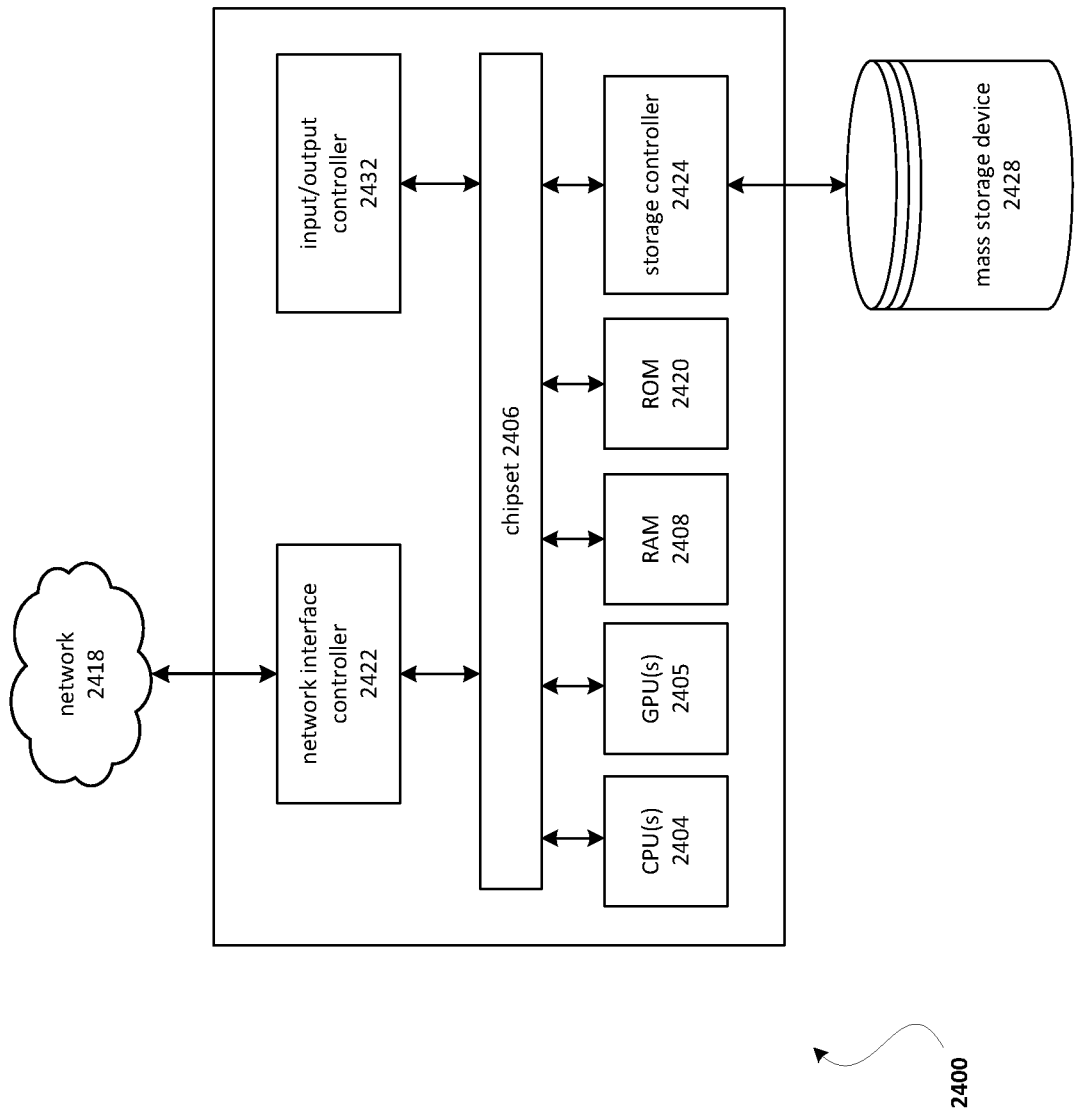
FIG. 24 shows an example computing device which may be used to perform any of the techniques disclosed herein.

FIG. 24 illustrates a computing device that may be used in various aspects, such as the services, networks, modules, and/or devices depicted in FIG. 1. With regard to the example architectures and systems of FIGS. 1-16, any or all of the components may each be implemented by one or more instance of a computing device 2400 of FIG. 24. The computer architecture shown in FIG. 24 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 2400 may include a baseboard, or "motherboard," which is a printed circuit board to which a multitude of components or devices may be connected by way of a system bus or other electrical communication paths. One or more central processing units (CPUs) 2404 may operate in conjunction with a chipset 2406. The CPU(s) 2404 may be standard programmable processors that perform arithmetic and logical operations necessary for the operation of the computing device 2400.

The CPU(s) 2404 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 2404 may be augmented with or replaced by other processing units, such as GPU(s) 2405. The GPU(s) 2405 may comprise processing units specialized for but not necessarily limited to highly parallel computations, such as graphics and other visualization-related processing.

A chipset 2406 may provide an interface between the CPU(s) 2404 and the remainder of the components and devices on the baseboard. The chipset 2406 may provide an interface to a random-access memory (RAM) 2408 used as the main memory in the computing device 2400. The chipset 2406 may further provide an interface to a computer-readable storage medium, such as a read-only memory (ROM) 2420 or non-volatile RAM (NVRAM) (not shown), for storing basic routines that may help to start up the computing device 2400 and to transfer information between the various components and devices. ROM 2420 or NVRAM may also store other software components necessary for the operation of the computing device 2400 in accordance with the aspects described herein.

The computing device 2400 may operate in a networked environment using logical connections to remote computing nodes and computer systems through local area network (LAN). The chipset 2406 may include functionality for providing network connectivity through a network interface controller (NIC) 2422, such as a gigabit Ethernet adapter. A NIC 2422 may be capable of connecting the computing device 2400 to other computing nodes over a network 2416. It should be appreciated that multiple NICs 2422 may be present in the computing device 2400, connecting the computing device to other types of networks and remote computer systems.

The computing device 2400 may be connected to a mass storage device 2428 that provides non-volatile storage for the computer. The mass storage device 2428 may store system programs, application programs, other program modules, and data, which have been described in greater detail herein. The mass storage device 2428 may be connected to the computing device 2400 through a storage controller 2424 connected to the chipset 2406. The mass storage device 2428 may consist of one or more physical storage units. The mass storage device 2428 may comprise a management component 2410. A storage controller 2424 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 2400 may store data on the mass storage device 2428 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 2428 is characterized as primary or secondary storage and the like.

For example, the computing device 2400 may store information to the mass storage device 2428 by issuing instructions through a storage controller 2424 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 2400 may further read information from the mass storage device 2428 by detecting the physical states or characteristics of one or more particular locations within the physical storage units.

In addition to the mass storage device 2428 described above, the computing device 2400 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 2400.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 2428 depicted in FIG. 24, may store an operating system utilized to control the operation of the computing device 2400. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 2428 may store other system or application programs and data utilized by the computing device 2400.

The mass storage device 2428 or other computer-readable storage media may also be encoded with computer-executable instructions, which, when loaded into the computing device 2400, transforms the computing device from a general-purpose computing system into a special-purpose computer capable of implementing the aspects described herein. These computer-executable instructions transform the computing device 2400 by specifying how the CPU(s) 2404 transition between states, as described above. The computing device 2400 may have access to computer-readable storage media storing computer-executable instructions, which, when executed by the computing device 2400, may perform the methods described herein.

A computing device, such as the computing device 2400 depicted in FIG. 24, may also include an input/output controller 2432 for receiving and processing input from a number of input devices, such as a keyboard, a mouse, a touchpad, a touch screen, an electronic stylus, or other type of input device. Similarly, an input/output controller 2432 may provide output to a display, such as a computer monitor, a flat-panel display, a digital projector, a printer, a plotter, or other type of output device. It will be appreciated that the computing device 2400 may not include all of the components shown in FIG. 24, may include other components that are not explicitly shown in FIG. 24, or may utilize an architecture completely different than that shown in FIG. 24.

As described herein, a computing device may be a physical computing device, such as the computing device 2400 of FIG. 24. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example

What is claimed is:

1. A method of guaranteeing online services based on predicting failures of storage devices, comprising:

extracting statistical data on a regular basis by each of a plurality of storage devices, wherein each of the plurality of storage devices comprise a set of NAND dies, and wherein each of the set of NAND dies is configured to measure and track a set of metrics indicating characteristics of each NAND die;

generating prediction data indicating potential failures of the plurality of storage devices;

sharing the prediction data with a host on a periodic basis;

creating, by the host, a strategy of decommissioning at least one of the plurality of storage devices and adding at least one new storage device based on the prediction data;

implementing data migration to the at least one new storage device before excluding the at least one of the plurality of storage devices based on the strategy;

wherein the method further comprises:

generating a sequence of measurements of the set of metrics by each of the set of NAND dies, wherein each measurement comprise a number of failed blocks and latencies of operations associated with each of the set of NAND dies;

comparing at least two measurements among the sequence of measurements; and predicting a time point of a first or next block failure and predicting a speed value of latency growth associated with each of the set of NAND dies.

2. The method of claim 1, further comprising:

generating, by the host, a strategy of distributing an input/output (I/O) load among the plurality of storage devices based on the prediction data.

3. The method of claim 1, wherein the generating prediction data indicating potential failures of the plurality of storage devices further comprises:

generating a prediction for each of the set of NAND dies in each of the plurality of storage devices; and generating a forecast of failure corresponding to each of the plurality of storage devices by aggregating the predictions for the set of NAND dies in each of the plurality of storage devices.

4. The method of claim 3, wherein the generating a prediction for each of the set of NAND dies in each of the plurality of storage devices further comprises:

determining a growth rate of latency of operations associated with each of the set of NAND dies, wherein a latency indicates a degradation state of each NAND die; and generating a prediction for each of the set of NAND dies based at least in part on the growth rate of latency associated with each of the set of NAND dies.

5. The method of claim 3, wherein each of the set of NAND dies comprises at least a subset of clean blocks, and wherein the generating a prediction for each of the set of NAND dies in each of the plurality of storage devices further comprises:

predicting a failure time point of each of the set of NAND dies based on a ratio of a number of remaining clean blocks to a depletion rate of the clean blocks in a corresponding NAND die.

6. The method of claim 1, further comprising:

establishing a timing mechanism in each of the plurality of storage devices, the timing mechanism configured to generate ticks by even intervals;

measuring numbers of operations in a measurement period by each of the set of NAND dies in each of the plurality of storage devices, wherein the operations comprise read operations, program operations, and erase operations; and measuring a total number of ticks in the measurement period by each of the set of NAND dies in each of the plurality of storage devices.

7. A system of guaranteeing online services based on predicting failures of storage devices, comprising:

at least one processor; and at least one memory communicatively coupled to the at least one processor and comprising computer-readable instructions that upon execution by the at least one processor cause the at least one processor to perform operations comprising:

extracting statistical data on a regular basis by each of a plurality of storage devices, wherein each of the plurality of storage devices comprise a set of NAND dies, and wherein each of the set of NAND dies is configured to measure and track a set of metrics indicating characteristics of each NAND die;

generating prediction data indicating potential failures of the plurality of storage devices;

sharing the prediction data with a host on a periodic basis;

creating, by the host, a strategy of decommissioning at least one the plurality of storage devices and adding at least one new storage device based on the prediction data;

implementing data migration to the at least one new storage device before excluding the at least one of the plurality of storage devices based on the strategy;

wherein the operations further comprise:

generating a sequence of measurements of the set of metrics by each of the set of NAND dies, wherein each measurement comprise a number of failed blocks and latencies of operations associated with each of the set of NAND dies;

comparing at least two measurements among the sequence of measurements; and predicting a time point of a first or next block failure and predicting a speed value of latency growth associated with each of the set of NAND dies.

8. The system of claim 7, the operations further comprising:

generating, by the host, a strategy of distributing an input/output (I/O) load among the plurality of storage devices based on the prediction data.

9. The system of claim 7, wherein the generating prediction data indicating potential failures of the plurality of storage devices further comprises:

generating a prediction for each of the set of NAND dies in each of the plurality of storage devices; and generating a forecast of failure corresponding to each of the plurality of storage devices by aggregating the predictions for the set of NAND dies in each of the plurality of storage devices.

10. The system of claim 9, wherein the generating a prediction for each of the set of NAND dies in each of the plurality of storage devices further comprises:

determining a growth rate of latency of operations associated with each of the set of NAND dies, wherein a latency indicates a degradation state of each NAND die; and generating a prediction for each of the set of NAND dies based at least in part on the growth rate of latency associated with each of the set of NAND dies.

11. The system of claim 9, wherein each of the set of NAND dies comprises at least a subset of clean blocks, and wherein the generating a prediction for each of the set of NAND dies in each of the plurality of storage devices further comprises:
predicting a failure time point of each of the set of NAND dies based on a ratio of a number of remaining clean blocks to a depletion rate of the clean blocks in a corresponding NAND die.

12. The system of claim 7, the operations further comprising:
establishing a timing mechanism in each of the plurality of storage devices, the timing mechanism configured to generate ticks by even intervals;
measuring numbers of operations in a measurement period by each of the set of NAND dies in each of the plurality of storage devices, wherein the operations comprise read operations, program operations, and erase operations; and
measuring a total number of ticks in the measurement period by each of the set of NAND dies in each of the plurality of storage devices.

13. A non-transitory computer-readable storage medium, storing computer-readable instructions that upon execution by a processor cause the processor to implement operations comprising:
extracting statistical data on a regular basis by each of a plurality of storage devices, wherein each of the plurality of storage devices comprise a set of NAND dies, and wherein each of the set of NAND dies is configured to measure and track a set of metrics indicating characteristics of each NAND die;
generating prediction data indicating potential failures of the plurality of storage devices;
sharing the prediction data with a host on a periodic basis;
creating, by the host, a strategy of decommissioning at least one of the plurality of storage devices and adding at least one new storage device based on the prediction data;
implementing data migration to the at least one new storage device before excluding the at least one of the plurality of storage devices based on the strategy;

wherein the operations further comprise:
generating a sequence of measurements of the set of metrics by each of the set of NAND dies, wherein each measurement comprise a number of failed blocks and latencies of operations associated with each of the set of NAND dies;
comparing at least two measurements among the sequence of measurements; and
predicting a time point of a first or next block failure and predicting a speed value of latency growth associated with each of the set of NAND dies.

14. The non-transitory computer-readable storage medium of claim 13, the operations further comprising:
generating, by the host, a strategy of distributing an input/output (I/O) load among the plurality of storage devices based on the prediction data.

15. The non-transitory computer-readable storage medium of claim 13, wherein the generating prediction data indicating potential failures of the plurality of storage devices further comprises:
generating a prediction for each of the set of NAND dies in each of the plurality of storage devices; and
generating a forecast of failure corresponding to each of the plurality of storage devices by aggregating the predictions for the set of NAND dies in each of the plurality of storage devices.

16. The non-transitory computer-readable storage medium of claim 15, wherein the generating a prediction for each of the set of NAND dies in each of the plurality of storage devices further comprises:
determining a growth rate of latency of operations associated with each of the set of NAND dies, wherein a latency indicates a degradation state of each NAND die; and
generating a prediction for each of the set of NAND dies based at least in part on the growth rate of latency associated with each of the set of NAND dies.

17. The non-transitory computer-readable storage medium of claim 15, wherein each of the set of NAND dies comprises at least a subset of clean blocks, and wherein the generating a prediction for each of the set of NAND dies in each of the plurality of storage devices further comprises:
predicting a failure time point of each of the set of NAND dies based on a ratio of a number of remaining clean blocks to a depletion rate of the clean blocks in a corresponding NAND die.

* * * * *